United States Patent [19]

Black et al.

[11] Patent Number: 6,068,436
[45] Date of Patent: May 30, 2000

[54] PASS THRU MECHANISM FOR TRANSFERRING MEDIA CARTRIDGES BETWEEN AUTOMATED CARTRIDGE LIBRARY SYSTEMS

[75] Inventors: David Christopher Black, Thornton; Joseph Paul Manes, Arvada; Timothy C. Ostwald, Louisville; Daniel James Plutt, Superior; Daniel W. Underkofler, Lafayette, all of Colo.

[73] Assignee: Storage Technology Corporation, Louisville, Colo.

[21] Appl. No.: 09/103,314

[22] Filed: Jun. 24, 1998

[51] Int. Cl.⁷ ..................................................... B65G 1/06
[52] U.S. Cl. .......................... 414/277; 414/801; 414/267; 198/406; 198/407
[58] Field of Search ..................................... 414/267, 277, 414/281, 807; 360/92; 369/35–39; 193/47; 198/406, 407, 409

[56] References Cited

U.S. PATENT DOCUMENTS

| | | | |
|---|---|---|---|
| 1,366,874 | 1/1921 | Christians | 193/47 X |
| 2,461,240 | 2/1949 | Maynard et al. | 193/47 X |
| 3,504,808 | 4/1970 | Carabateas | 214/16.4 |
| 3,587,804 | 6/1971 | Marenco | 193/47 |
| 3,782,517 | 1/1974 | Newcomb | 193/47 |
| 4,779,151 | 10/1988 | Lind et al. | 260/92 |
| 4,864,438 | 9/1989 | Munro | 360/92 |
| 4,932,826 | 6/1990 | Moy et al. | 414/277 |
| 5,277,534 | 1/1994 | Andreson et al. | 414/277 X |
| 5,336,030 | 8/1994 | Ostwald et al. | 414/277 |
| 5,429,470 | 7/1995 | Nicol et al. | 414/331 |
| 5,610,882 | 3/1997 | Dang . | |
| 5,700,125 | 12/1997 | Falace et al. . | |

*Primary Examiner*—Gregory A. Morse
*Attorney, Agent, or Firm*—Duft, Graziano & Forest

[57] ABSTRACT

The pass thru mechanism for automated cartridge library systems serves to interconnect two juxtaposed operationally independent automated cartridge library systems and provides a simple apparatus that makes use of gravity to obviate the need for complex mechanical mechanisms to pass the media cartridge between the juxtaposed automated cartridge library systems. In particular, the pass thru mechanism comprises a media cartridge receiver that accepts a media cartridge from an automated cartridge library robot and then deposits the media cartridge in a media cartridge positioning mechanism. The media cartridge positioning mechanism uses gravity to tumble the media cartridge down a ramp into a media cartridge transport that delivers the media cartridge to the robot located in the juxtaposed media cartridge receiving automated cartridge library system. The media cartridge positioning mechanism operates to reorient the media cartridge from a horizontal orientation to a vertical orientation while concurrently turning the media cartridge as it tumbles through its path to present the label end of the media cartridge to the robot that is located in the media cartridge receiving automated cartridge library system.

13 Claims, 21 Drawing Sheets

PASS THRU MECHANISM FOR TRANSFERRING MEDIA CARTRIDGES BETWEEN AUTOMATED CARTRIDGE LIBRARY SYSTEMS

FIELD OF THE INVENTION

This invention relates to automated cartridge library systems that function to robotically store and retrieve media cartridges in a plurality of cartridge storage locations and, in particular, to a gravity fed pass thru mechanism that interconnects two juxtaposed, operationally independent automated cartridge library systems to enable the robots contained in the two automated cartridge library systems to exchange media cartridges.

Problem

It is a problem in automated cartridge library systems to enable a plurality of independent automated cartridge library systems to operate together in a unified manner. In particular, the typical automated cartridge library system is a selfcontained unit that contains a plurality of magnetic tape cartridge storage locations that are serviced by a robot mechanism. The robot mechanism functions to retrieve a magnetic tape cartridge from its assigned magnetic tape cartridge storage location in the automated cartridge library system and load the retrieved magnetic tape cartridge into a designated tape drive for the reading and/or writing of data thereon. When the tape drive is finished with the magnetic tape cartridge, the robot mechanism retrieves the magnetic tape cartridge from the tape drive and returns it to its assigned magnetic tape cartridge storage location.

The automated cartridge library system is completely enclosed by a housing to prevent a user from either interfering with the robot mechanism or being injured by the operation of the robot mechanism or gaining unauthorized access to the magnetic tape cartridges that are housed in the automated cartridge library system and the data stored on these magnetic tape cartridges. Given the completely enclosed nature of the automated cartridge library system, a cartridge access port is typically provided to enable magnetic tape cartridges to bra entered into and retrieved from the automated cartridge library system by the user. The cartridge access port provides an apparatus that receives a magnetic tape cartridge from a user and then presents this magnetic tape cartridge to the robot mechanism for storage in an assigned magnetic tape cartridge storage location. The cartridge access port is designed both to protect the user in that it presents an impenetrable barrier to prevent direct contact between the user and the robot mechanism and to protect the data stored on the magnetic tape cartridges that are housed in the automated cartridge library system from unauthorized access by users.

There are numerous cartridge access ports and a typical one is illustrated in U.S. Pat. No. 4,779,151, titled "Robotic Tape Cassette Handling System With Rotary Loading and Unloading Mechanism". This cartridge access port comprises a rotatable door located within the library that can be positioned in one of two rotatable states. In a first state, the door presents a plurality of cartridge storage slots to the user to enable the user to input cartridges into the library or retrieve cartridges from the library. In the second rotatable state, the door presents the plurality of cartridge storage slots to the robot mechanism to enable the robot mechanism to receive cartridges into the library or eject cartridges from the library. This cartridge access port is rotatable completely within the library housing and provides the user with a mechanism to input cartridges into the library or retrieve cartridges from the library without having to shut down the library system to access the interior portion thereof.

Another cartridge access port mechanism is disclosed U.S. Pat. No. 4,932,826, titled "Automated Cartridge System". This cartridge access port mechanism includes a plurality of cartridge storage cells for the placement and retrieval of magnetic tape cartridges by both the user and the robot mechanism. The cartridge storage cells are mounted on a door that is hinged in a manner that permits the door to swing outward away from the housing of the automated cartridge library system to expose the array of cartridge storage cells. Also included in this mechanism is an articulated wall segment that closes the opening in the housing when the cartridge access port hinged door is opened. The articulated wall segment prevents the user from accessing the inner portion of the automated cartridge library system and the robot mechanism contained therein. This cartridge access port does not rotate within the library housing as the priory mentioned cartridge access port, but instead pivots away from the housing to provide the user with access to the cartridge storage cells mounted on the cartridge access port.

While the above-noted cartridge access ports serve the needs of the user to input cartridges into the library or retrieve cartridges from the library, such an apparatus is inoperable to enable the robot mechanisms in two juxtaposed automated cartridge library systems to automatically exchange magnetic tape cartridges, independent of the user. Therefore, a unique pass thru mechanism must be provided to interconnect two juxtaposed automated cartridge library systems in a manner to enable a robot mechanism to pass a selected magnetic tape cartridge to the robot mechanism in a juxtaposed automated cartridge library system without the need for user intervention. The ability to automatically exchange magnetic tape cartridges provides a load balancing capability whereby idle tape drives in an automated cartridge library system are accessible by the robot mechanism located in a juxtaposed automated cartridge library system by means of the pass thru mechanism.

The only existing automated cartridge library systems to make use of a pass thru mechanism are those manufactured by Storage Technology Corporation. Such a pass thru mechanism is disclosed in U.S. Pat. No. 4,864,438, titled "Tape Cartridge Movement Management in an Automated Cartridge Library System" and U.S. Pat. No. 4,932,826, titled "Automated Cartridge System". The pass thru mechanism illustrated in these patents comprises a carriage that supports a plurality of magnetic tape cartridge storage slots. The carriage operates on a track, driven by a lead screw mechanism to transport magnetic tape cartridges between two juxtaposed operationally independent automated cartridge library systems. The carriage is mounted on a swivel and presents the magnetic tape cartridges to a first robot in the proper orientation when the carriage is positioned at a first end of its track. However, this cartridge orientation is 180° out of alignment with respect to the second robot mechanism located at the second end of the track. The pass thru mechanism therefore rotates the magnetic tape cartridge prior to reaching the second end of the track to thereby present the magnetic tape cartridge to the second robot mechanism in the proper orientation. This is accomplished by the use of a cam feature that rotates the carriage from its first orientation to its second orientation as the carriage is driven by the lead screw and traverses the track from the first end to the second end. The pass thru mechanism does not include any user protection apparatus as does the cartridge access ports because the user cannot access the pass thru mechanism due to its location between two juxtaposed automated cartridge library systems.

While the above-noted carriage/lead screw mechanism is effective to enable the robot mechanism to exchange magnetic tape cartridges, this pass thru mechanism is costly and mechanically complex. Since the cost to the customer in library down time is significant, any reduction in pass thru port maintenance represents a valuable improvement to automated cartridge library systems.

Solution

The above-described problems are solved and a technical advance achieved in the field by the present pass thru mechanism for automated cartridge library systems that serves to interconnect two juxtaposed operationally independent automated cartridge library systems and provides a simple apparatus that makes use of gravity to obviate the need for complex mechanical mechanisms to pass the media cartridge between the juxtaposed automated cartridge library systems. In particular, the pass thru mechanism comprises a media cartridge receiver that accepts a media cartridge from an automated cartridge library robot and then deposits the media cartridge in a media cartridge positioning mechanism. The media cartridge positioning mechanism uses gravity to tumble the media cartridge down a ramp through a complex repositioning and thence into a media cartridge transport that delivers the media cartridge to the robot located in the juxtaposed media cartridge receiving automated cartridge library system. The media cartridge positioning mechanism operates to reorient the media cartridge from a horizontal orientation to a vertical orientation while concurrently turning the media cartridge as it tumbles through its path to present the label end of the media cartridge to the robot that is located in the media cartridge receiving automated cartridge library system.

DETAILED DESCRIPTION

Figure 1:
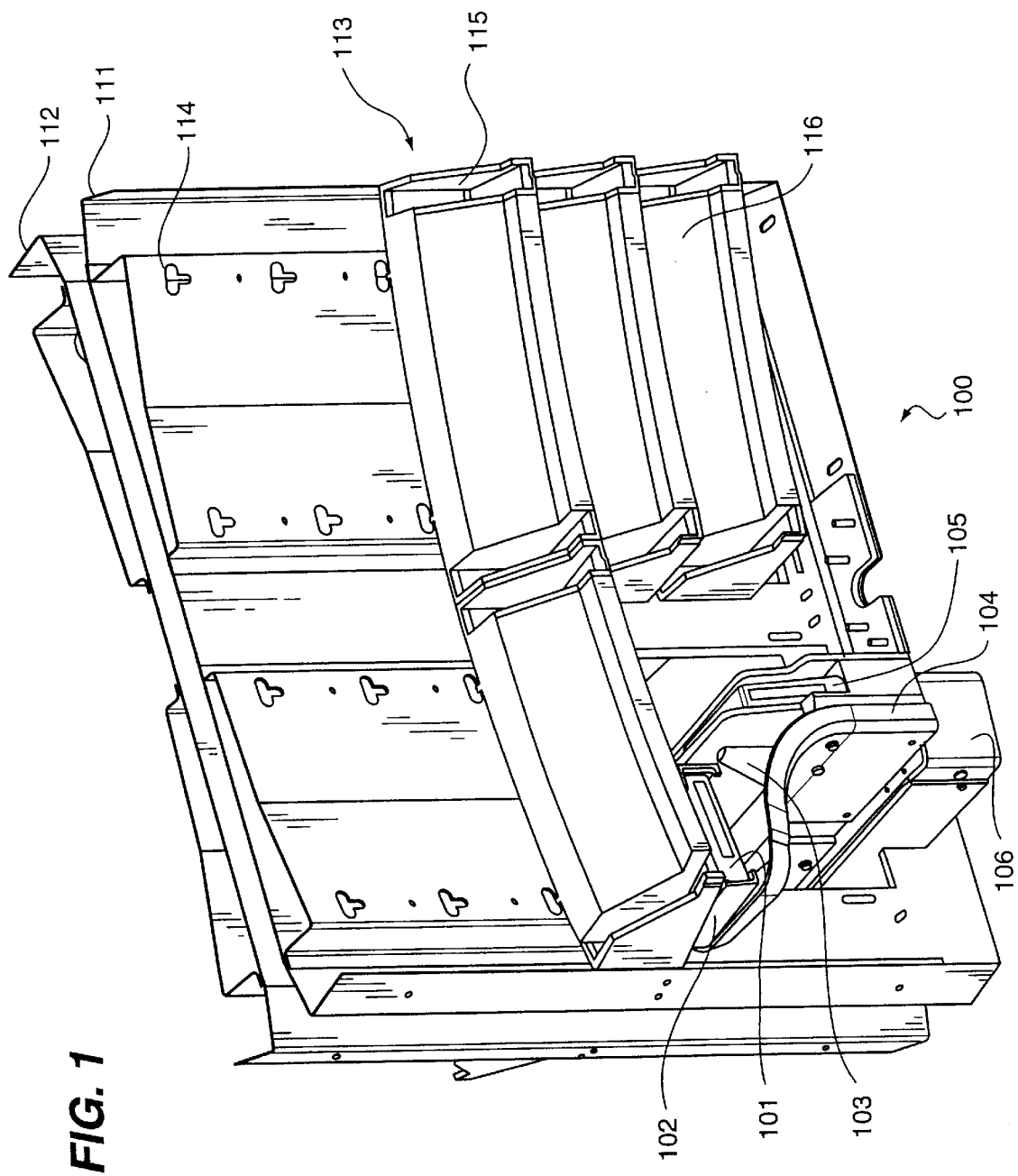
FIG. 1 illustrates a perspective view of two juxtaposed automated cartridge library systems that are equipped with the present pass thru mechanism for transferring media cartridges between automated cartridge library systems.

FIG. 1 illustrates a perspective view of two juxtaposed automated cartridge library systems that are equipped with the present pass thru mechanism 100 for transferring media cartridges between automated cartridge library systems. In particular, the automated cartridge library systems 111, 112 are a well known apparatus, such as the 4400 ACS manufactured by Storage Technology Corporation. The automated cartridge library systems 111, 112 comprise an exterior housing that encloses an anthromorphic robotic arm mechanism (not shown) that functions to retrieve media cartridges from a plurality of cartridge storage locations 115 in cartridge storage arrays 113. Each cartridge storage array 113 comprises a plurality of cartridge storage shelves 116, each of which contains a plurality of cartridge storage locations 115 formed therein. The cartridge storage shelves 116 are stacked vertically by means of features that are formed on the back of each shelf, which engage mating openings 114 in the housing of the automated cartridge library system 111. A plurality of tape drives are served by each of the automated cartridge library systems 111, 112 for the reading and writing of data on the media cartridges that are loaded therein.

Architecture of the Pass Thru Mechanism

Figure 2:
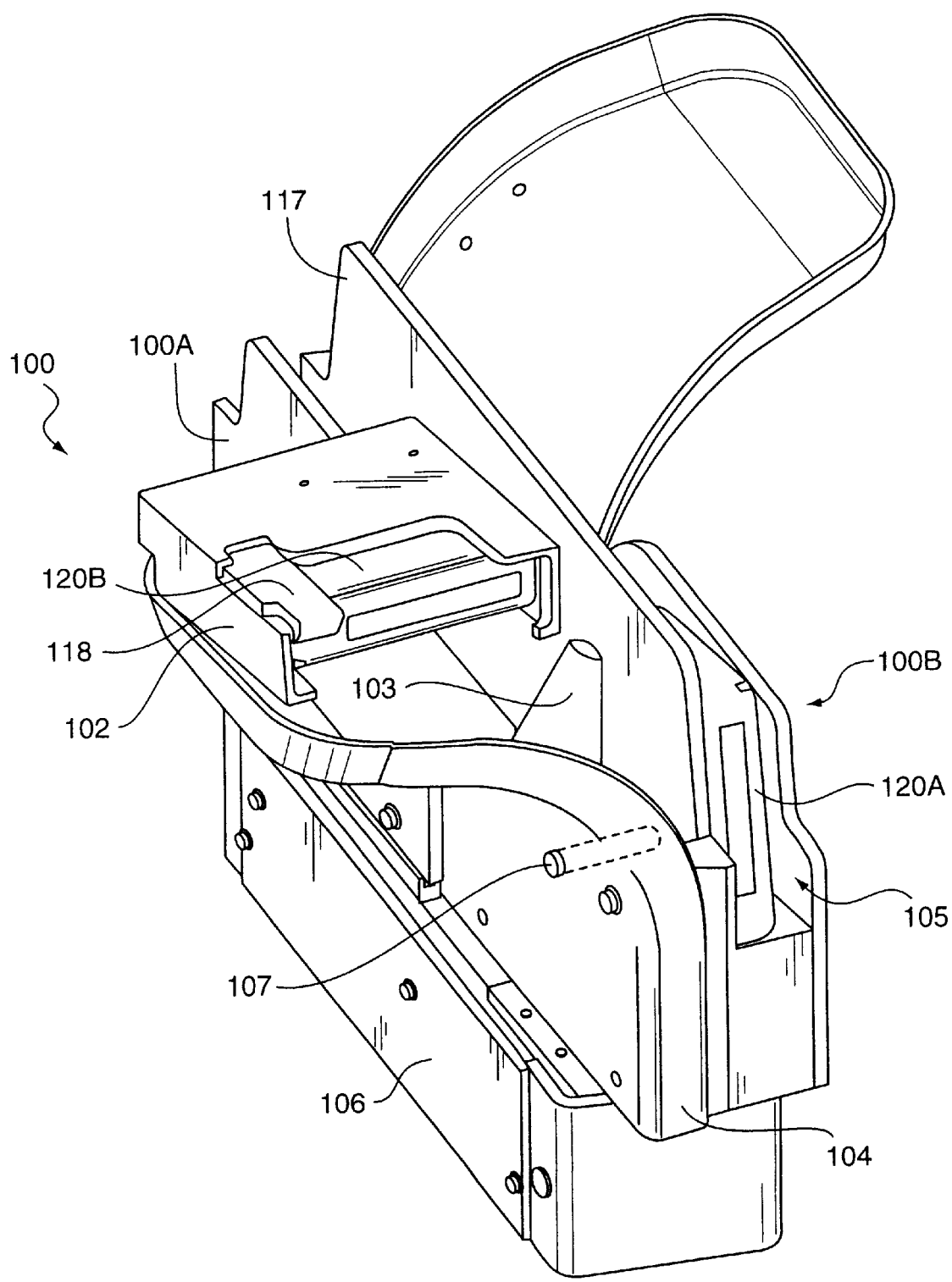
FIGS. 2–4 illustrate perspective, front and top views, respectively, of the present pass thru mechanism for transferring media cartridges between automated cartridge library systems as removed from the automated cartridge library system.

The pass thru mechanism 100 is connected to and interconnects the two automated cartridge library systems 111, 112 to exchange media cartridges therebetween. The pass thru mechanism 100, as also shown in FIG. 2 in perspective view, in FIG. 3 in front view, and in FIG. 4 in top view, comprises first 100A and second 100B unidirectional pass thru elements, which enable the transportation of a media cartridge from a first automated cartridge library system 111 to a second juxtaposed automated cartridge library system 112 and from the second automated cartridge library system 112 to the first juxtaposed automated cartridge library system 111, respectively. The first 100A and second 100B unidirectional pass thru elements are separated by a wall 117.

A pass thru element 100A comprises a media cartridge receiver 102 that serves to accept a media cartridge 120B that is presented by the automated cartridge library system robot. The media cartridge receiver 102 includes two opposing side walls that position the received media cartridge 120B in the proper position. Located immediately below the media cartridge receiver 102 is a ramp 104 that is equipped with first 103 and second 107 bumpers that collectively function to tumble the media cartridge 120B when it is dropped from the media cartridge receiver 102 in a manner to reorient the media cartridge into a position that is required for the robot located in the second automated cartridge library system 112 to grasp the media cartridge. A drive assembly 106 operates a media carriage 119 that slides the media cartridge along a media cartridge path 109 to an exit port 105 where the media cartridge (such as media cartridge 120A for the second pass thru element 100B) is presented for delivery to the robot located in the second automated cartridge library system 112.

Figure 13:
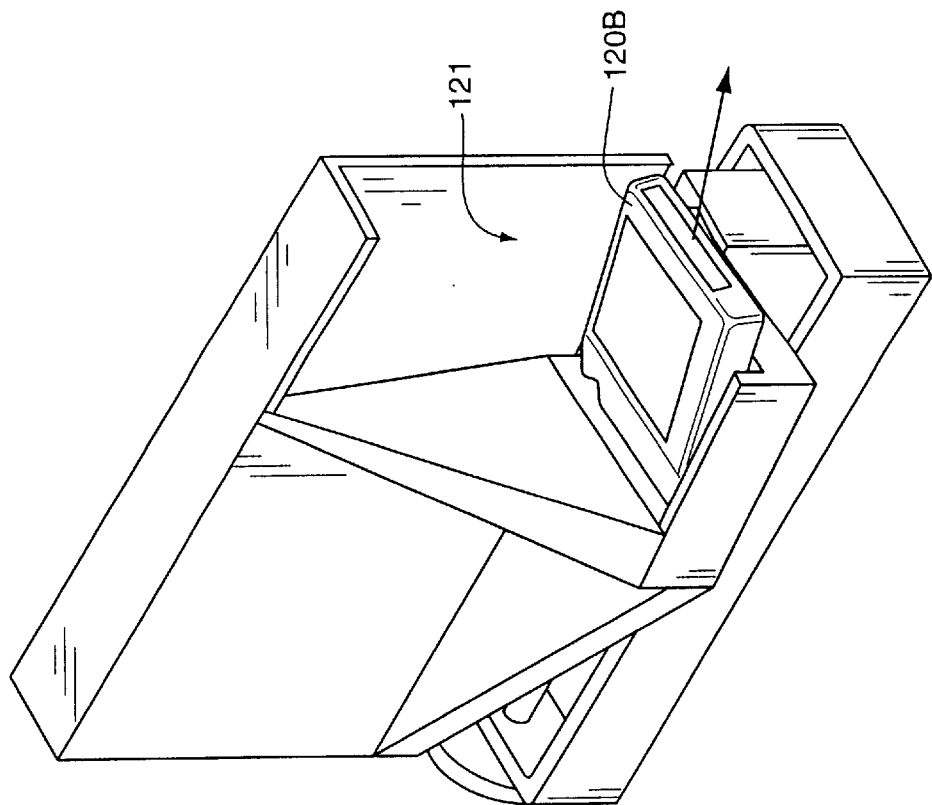
FIGS. 12 and 13 illustrate in perspective view a media cartridge repositioning mechanism located at the exit port of the pass thru mechanism.
Figure 12:
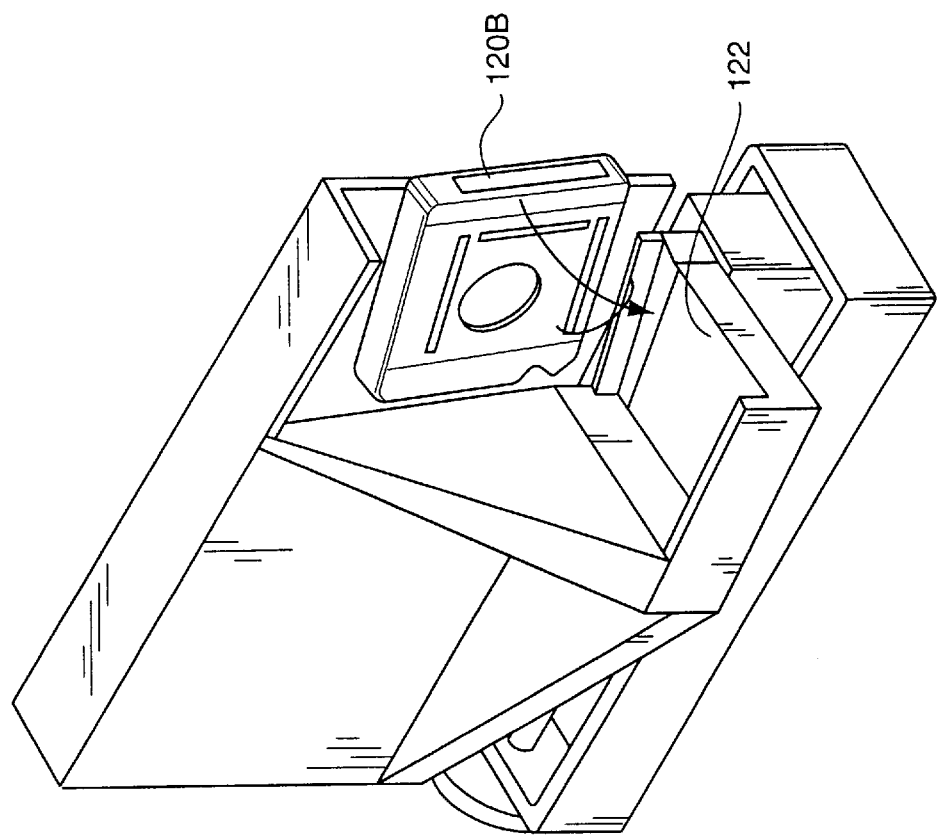

As can be seen from these figures, the robot in the first automated cartridge library system 111, through its gripper roll mechanism (not shown) reorients the media cartridge from its vertical media cartridge storage location 115 orientation to the horizontal media cartridge orientation of the media cartridge receiver 102. The selected orientations of these elements are partially a function of space utilization. In particular, the existing automated cartridge library systems typically use a vertical media cartridge storage location and the associated media drive elements use a horizontal media cartridge loading opening. Therefore, the pass thru mechanism 100 is consistent with the media drive element presentation. Furthermore, the use of a horizontal media cartridge orientation for the media cartridge receiver 102 reduces the vertical height of the pass thru mechanism 100, thereby saving valuable space in the automated cartridge library system. The mechanism illustrated in FIGS. 1–4 can optionally be implemented with a vertically oriented media cartridge receiver 102 and a horizontally oriented exit port (as shown in FIGS. 12 and 13).

Operation of the Pass Thru Mechanism

Figure 5:
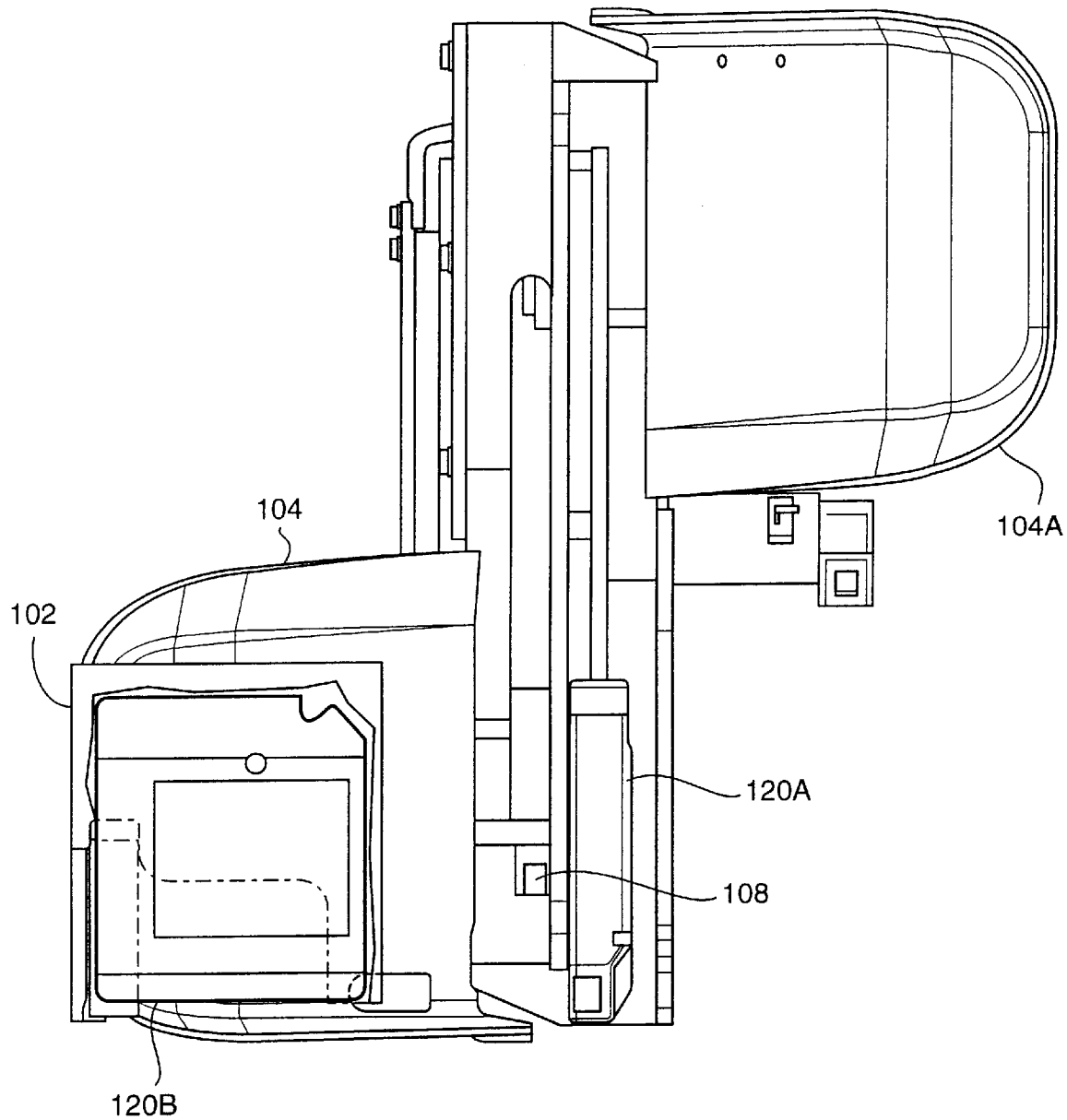
FIGS. 5–7 illustrate top views of the present pass thru mechanism for transferring media cartridges between automated cartridge library systems illustrating the stepwise progression of a media cartridge through this mechanism.
Figure 6:
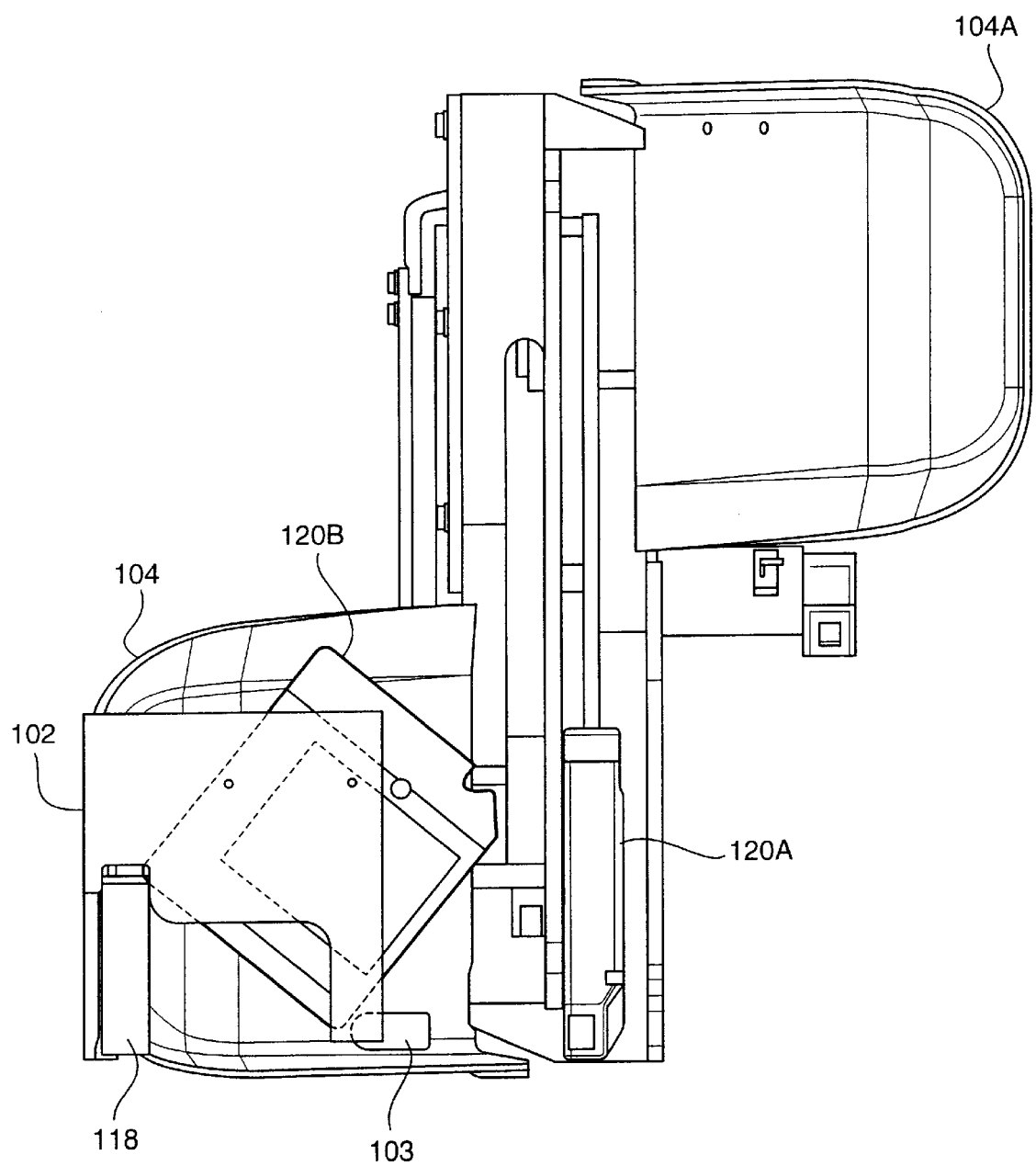
Figure 7:
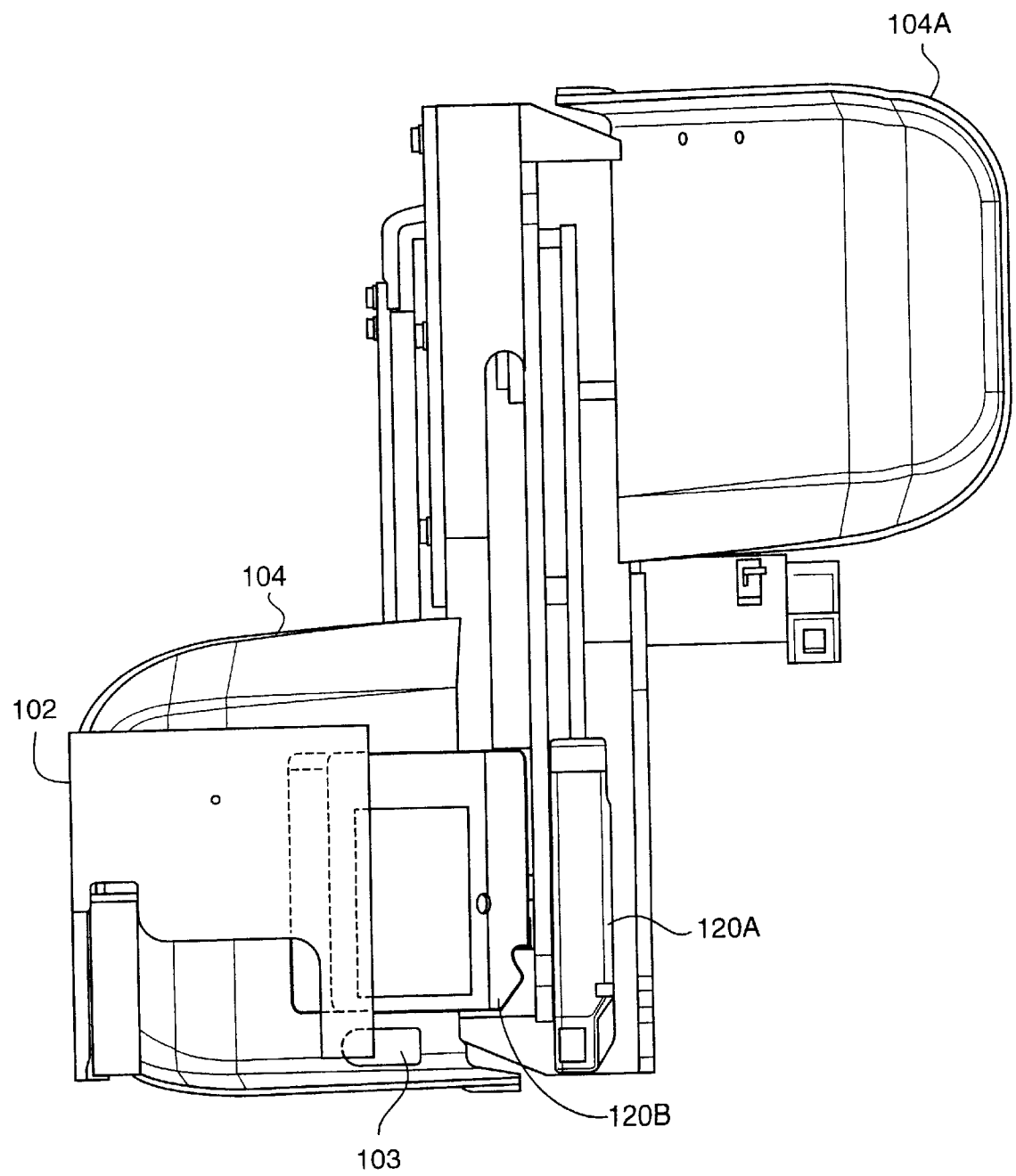

FIGS. 5–7 illustrate top views and FIGS. 8–11 illustrate cross-section side views of the present pass thru mechanism 100 for transferring media cartridges between automated cartridge library systems to illustrate the stepwise progression of a media cartridge through this pass thru mechanism 100. In particular, the robot that is located in the automated cartridge library system 111 places a media cartridge 120B in the media cartridge receiver 102 as shown in FIG. 5. When the media cartridge 120B is completely inside of the media cartridge receiver 102, a latch mechanism 118 drops down to retain the media cartridge 120B inside of the media cartridge receiver 102. The robot then releases the media cartridge 120B from its gripper mechanism and begins to withdraw the gripper from the media cartridge 120B. There is no vertical support provided to the media cartridge 120B by the media cartridge receiver 102 and the gripper mechanism is what holds the media cartridge 120B in place in the media cartridge receiver 102. Thus, the latch mechanism 118 prevents the media cartridge 120B from being withdrawn from the media cartridge receiver 102 when the robot withdraws the gripper.

Figure 3:
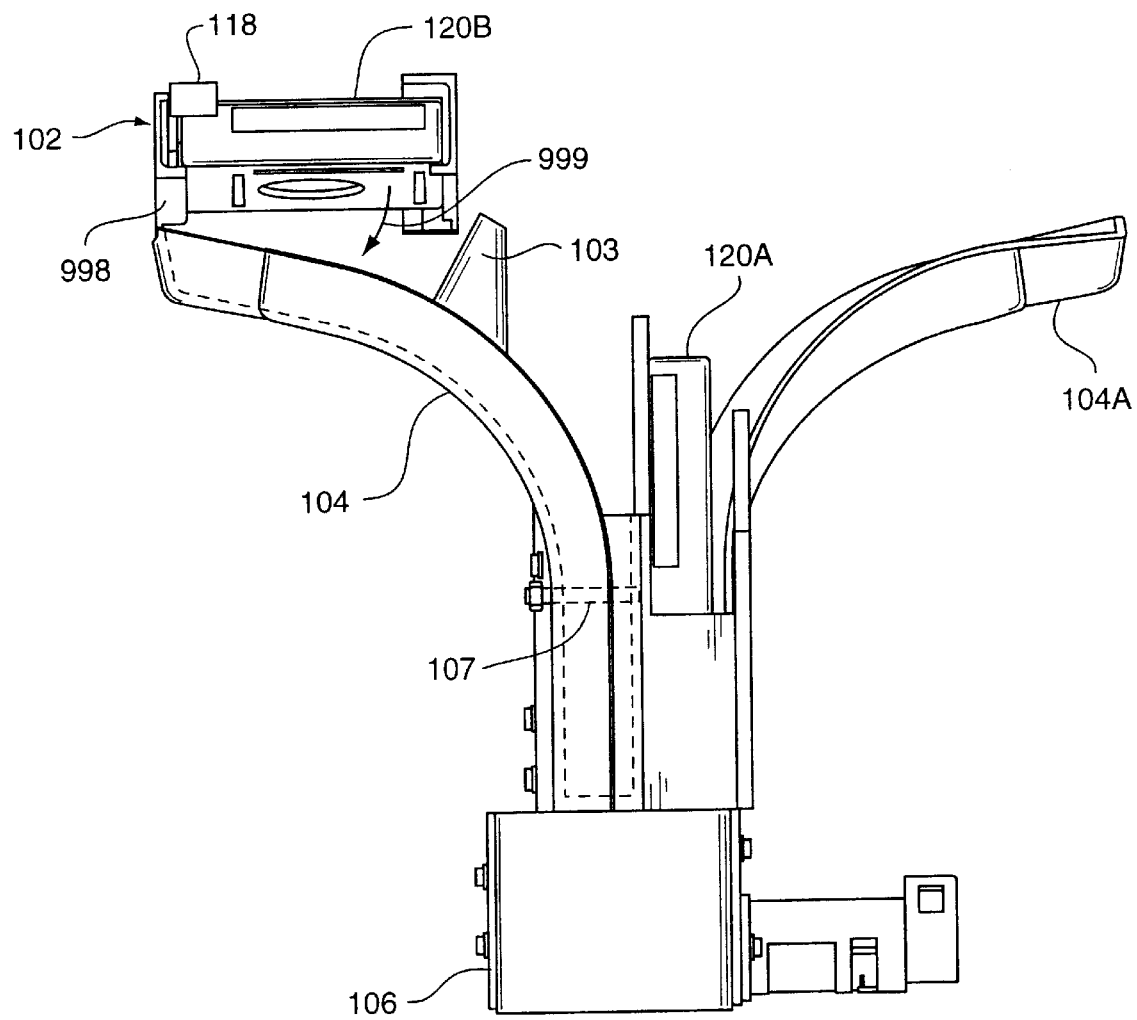
Figure 4:
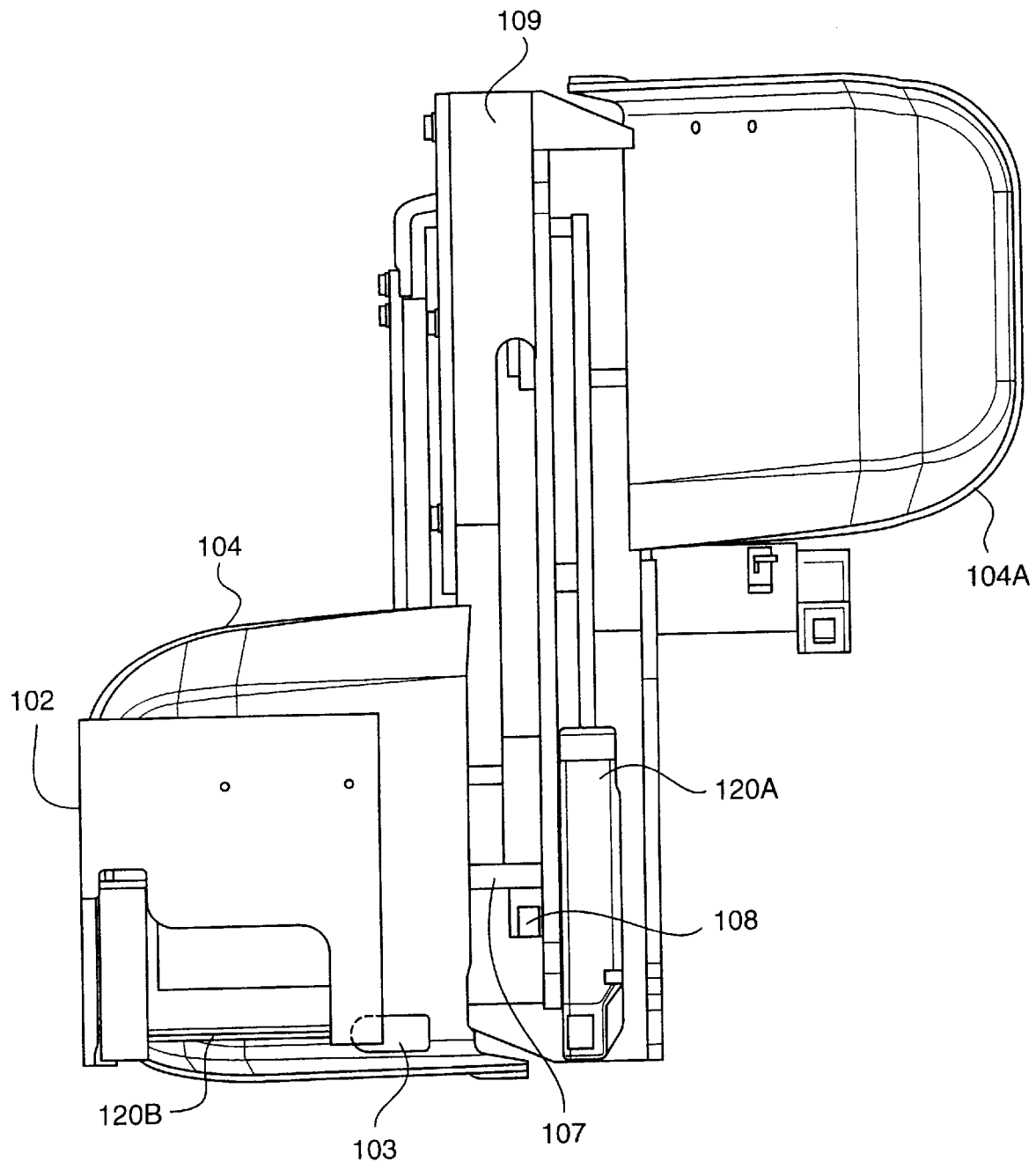
Figure 8:
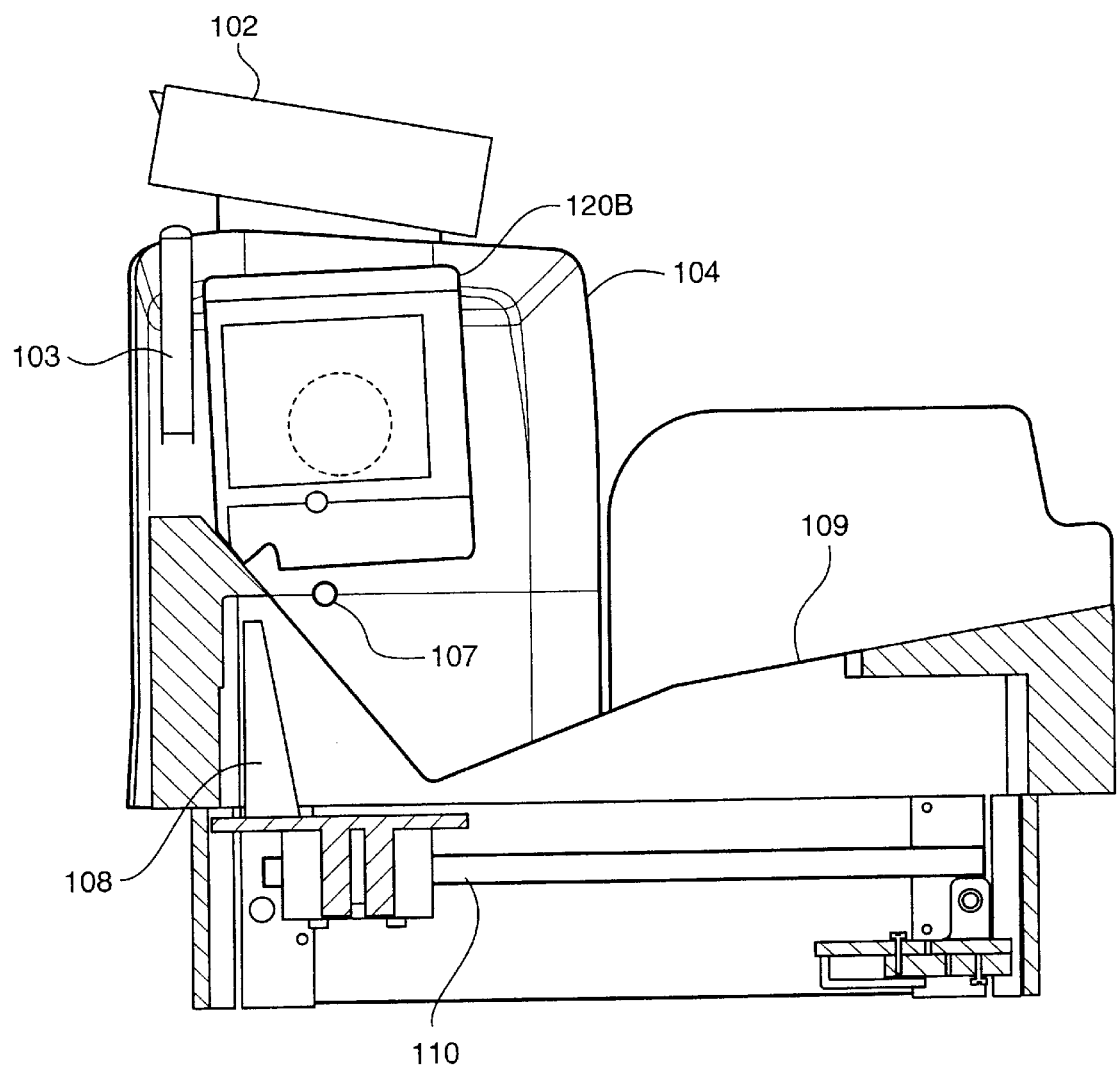
FIGS. 8–11 illustrate cross-section side views of the present pass thru mechanism for transferring media cartridges between automated cartridge library systems illustrating the stepwise progression of a media cartridge through this mechanism.
Figure 9:
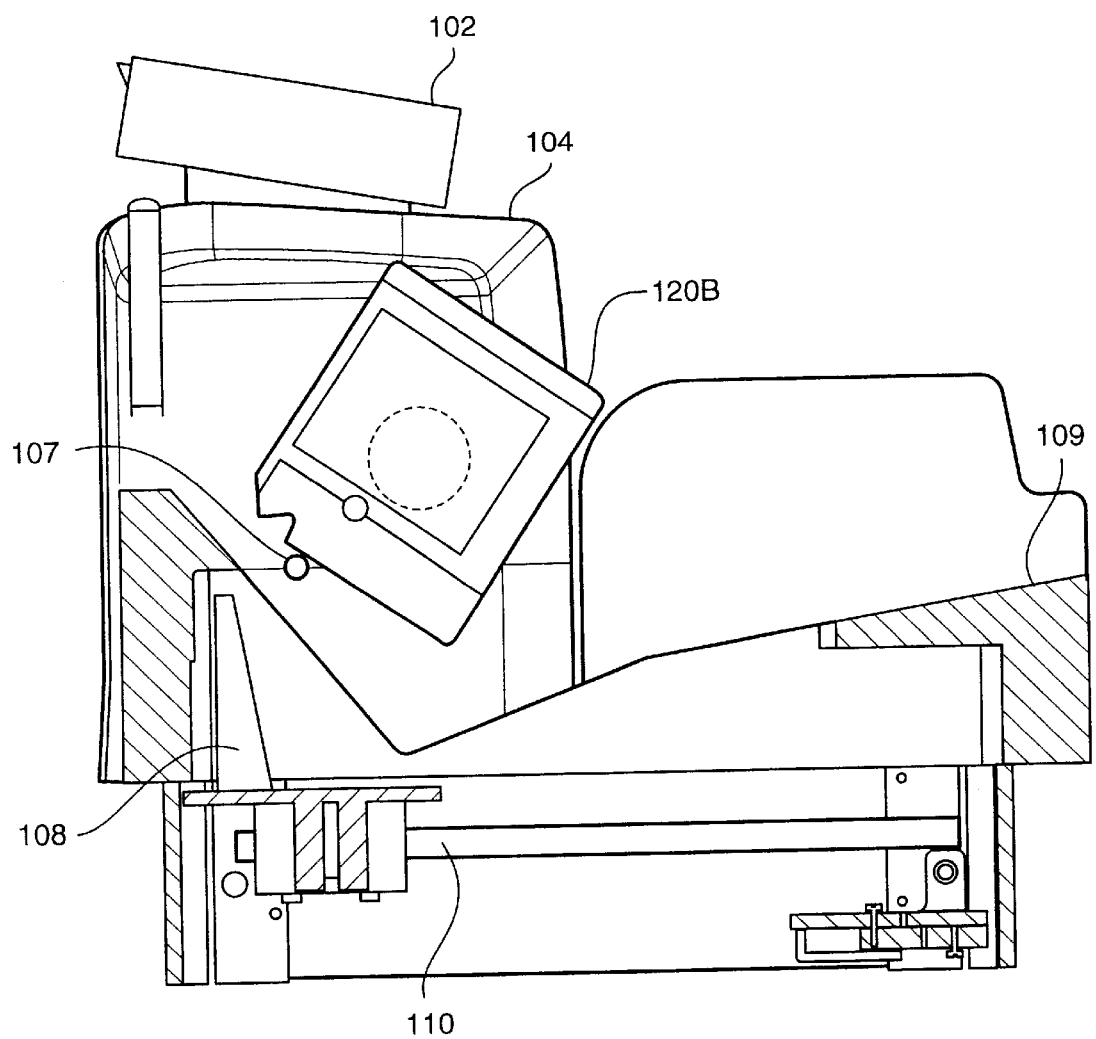

When the robot gripper is removed from the media cartridge 120B, the media cartridge 120B begins to fall in direction 999, as shown in FIG. 3, from the media cartridge receiver 102. The media cartridge 120B pivots about receiver ledge 998, and falls down into the ramp 104 where the media cartridge 120B strikes the first bumper 103. A predetermined point of impact on the media cartridge 120B, in particular the front corner of the media cartridge 120B, hits the first bumper 103 and causes the media cartridge 120B to begin tumbling, pivoting 90° to the right (as shown in FIG. 6) around the first bumper 103. In addition, as the media cartridge 120B fall down ramp 104, the media cartridge 120B is reoriented from a horizontal orientation to a vertical orientation as the ramp 104 funnels the media cartridge 120B into the cartridge path 109. Furthermore, as shown in FIG. 8, the media cartridge 120B in its downward tumble, encounters the second bumper 107 and sloped wall of the ramp 104 which causes the media cartridge 120B to further tumble as shown in FIG. 9, pivoting 90° around the second bumper 107 until the media cartridge 120B comes to rest in the media cartridge path 109 as shown in FIG. 10.

Figure 20:
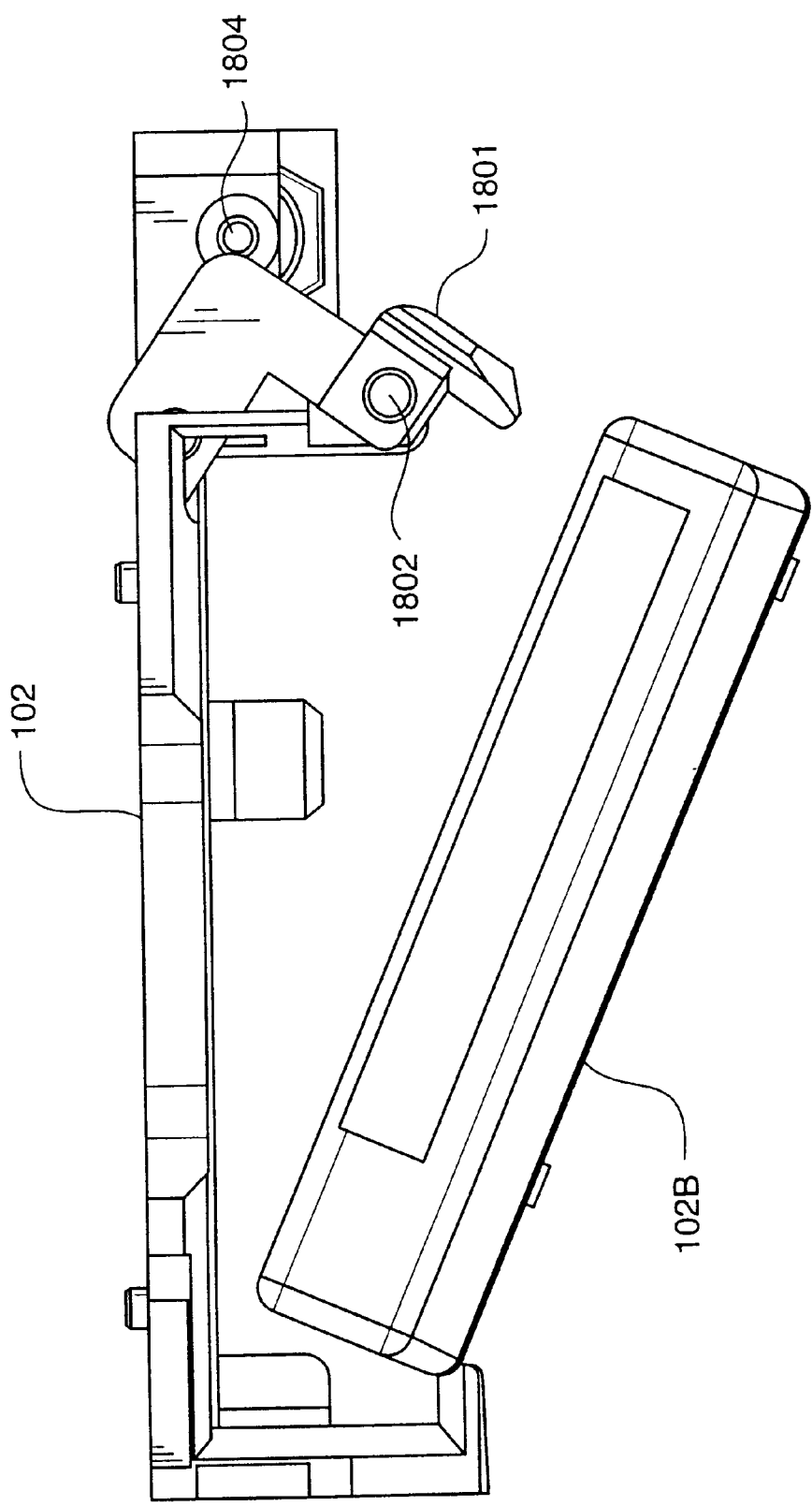
Figure 21:
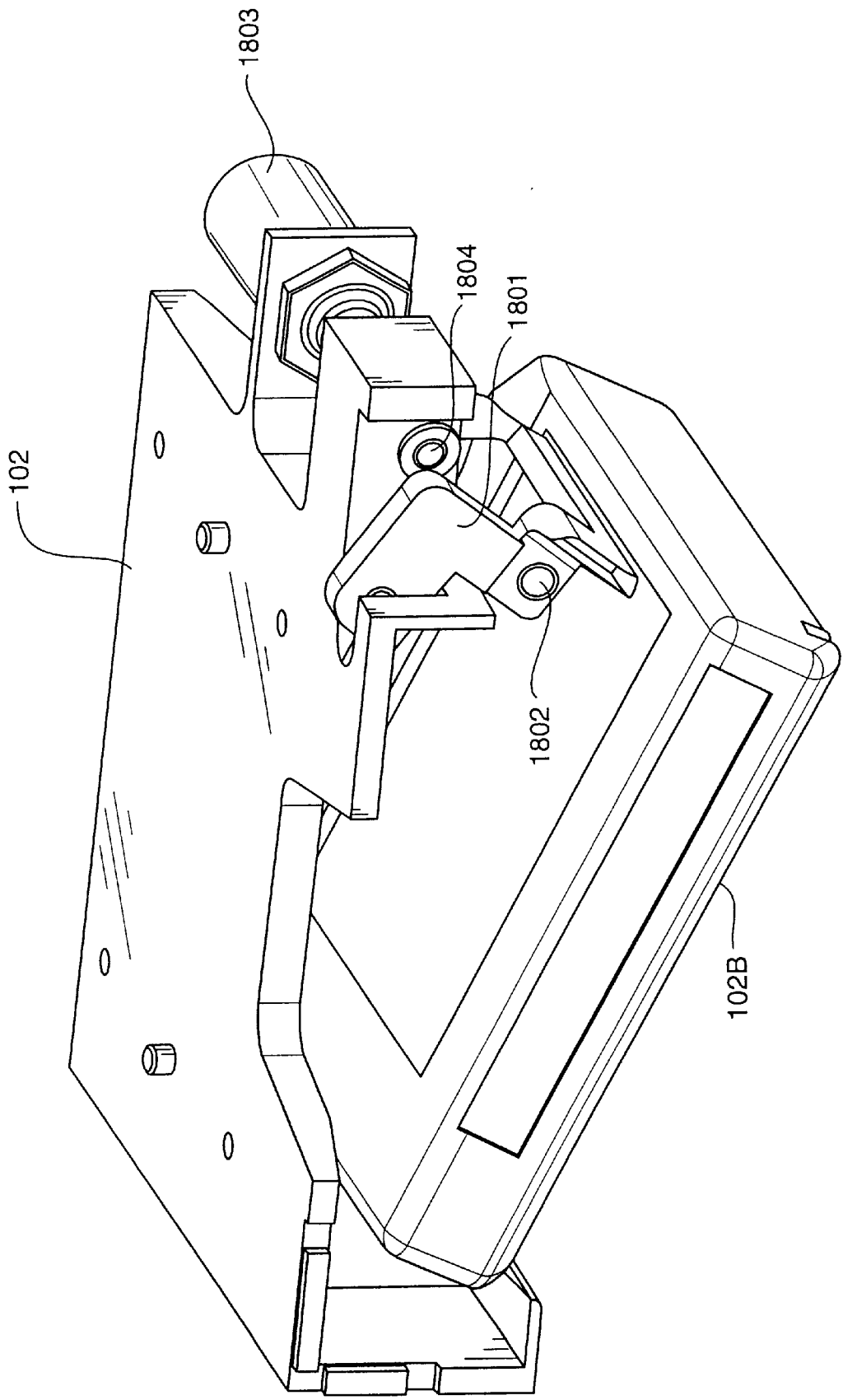
Figure 22:
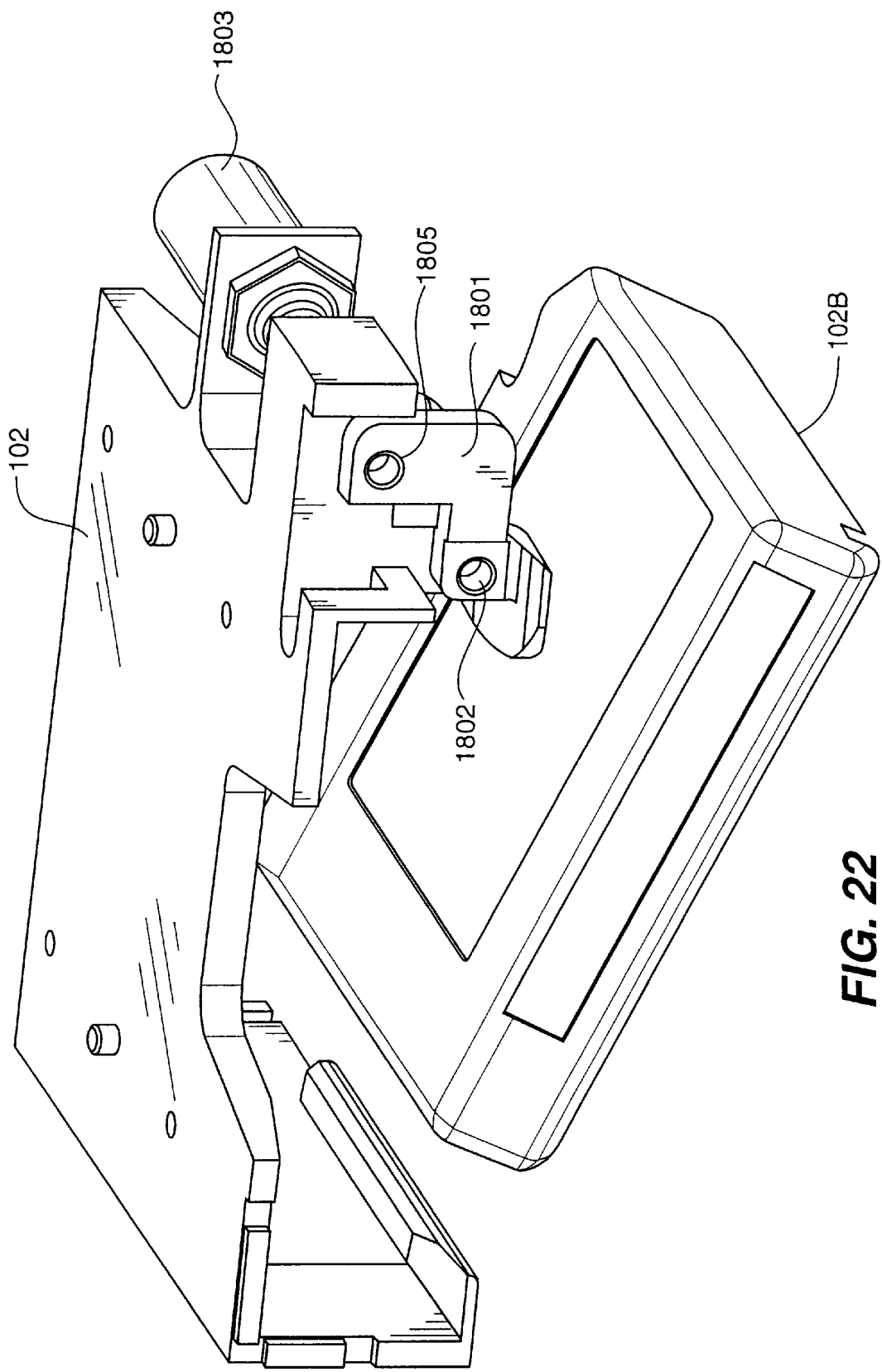

FIGS. 18–22 illustrate various views of an embodiment of the media cartridge receiver of the present pass thru mechanism. There is vertical support provided to the media cartridge 120B by the cartridge support arm 1801 of the media cartridge receiver 102, which cartridge support arm is pivotally connected via pivot shaft 1802 to the body of the media cartridge receiver 102. The pivot action of the cartridge support arm 1801 is controlled by the use of solenoid 1803 which includes a solenoid shaft 1804 that fits in an aperture 1805 of the cartridge support arm 1801 to prevent pivoting of the cartridge support arm 1801 about the pivot shaft 1802. When the robot gripper is removed from the media cartridge 102B, the media cartridge 102B is held in place by the cooperative action of the latch mechanism 118 and cartridge support arm 1801. To initiate the next step in the transfer of the media cartridge 102B through pass thru mechanism 100, the solenoid 1803 is activated to withdraw the solenoid shaft 1804 from the aperture 1805, the weight of the media cartridge 102B causing the cartridge support arm 1801 to pivot about the pivot shaft 1802 as shown in FIGS. 20 and 21. The media cartridge 102B begins to fall in a direction 999, as also shown in FIG. 3, from the media cartridge receiver 102. Once the media cartridge 102B clears the cartridge support arm 1804, a latch spring (not shown) pivots the cartridge support arm 1801 back to its initial position as shown in FIG. 22 such that the solenoid 1803 can be released, causing the solenoid shaft 1804 to enter aperture 1805 to thereby place the cartridge receiver 102 in a mode to receive the next media cartridge.

Figure 10:
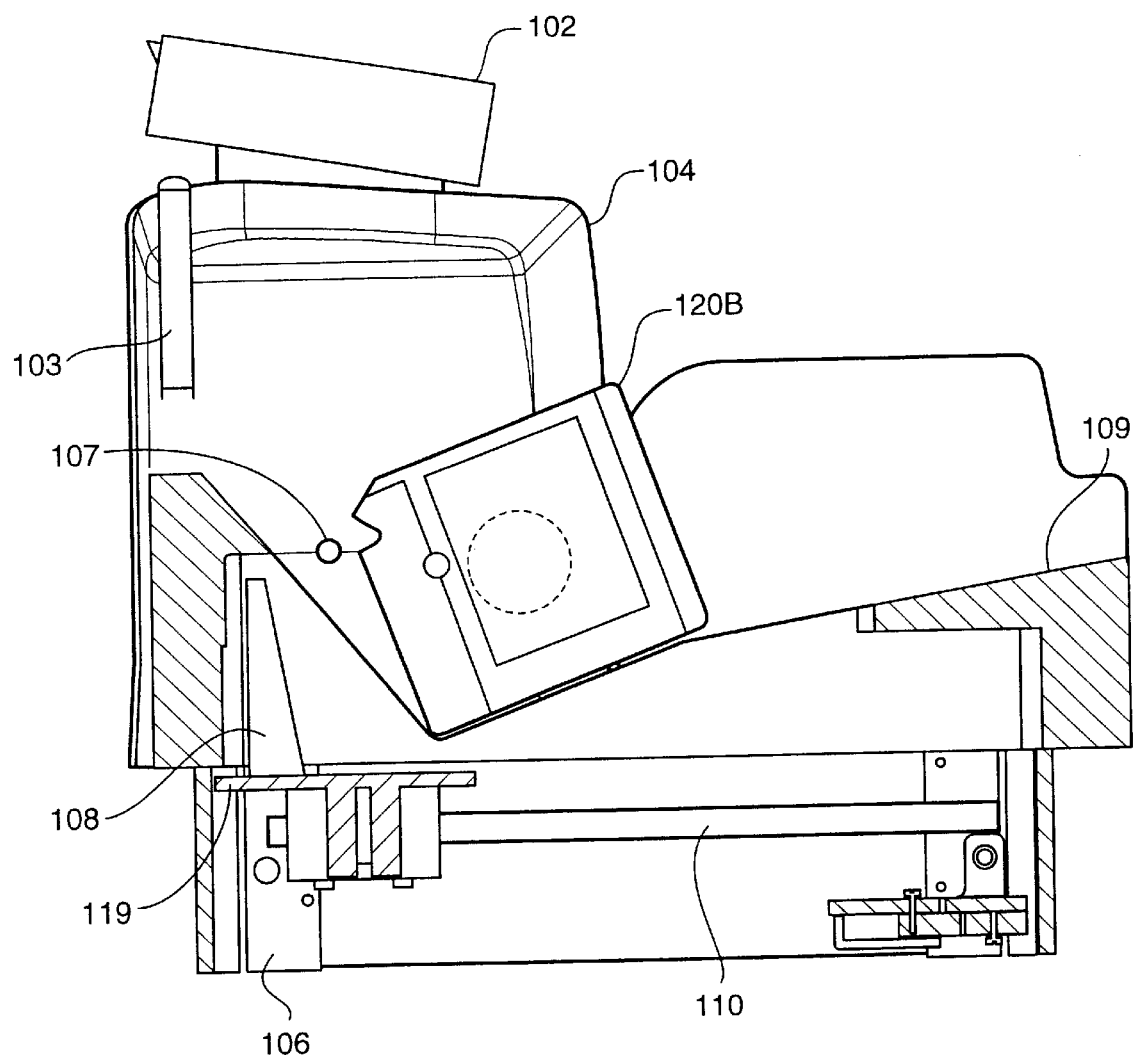
Figure 11:
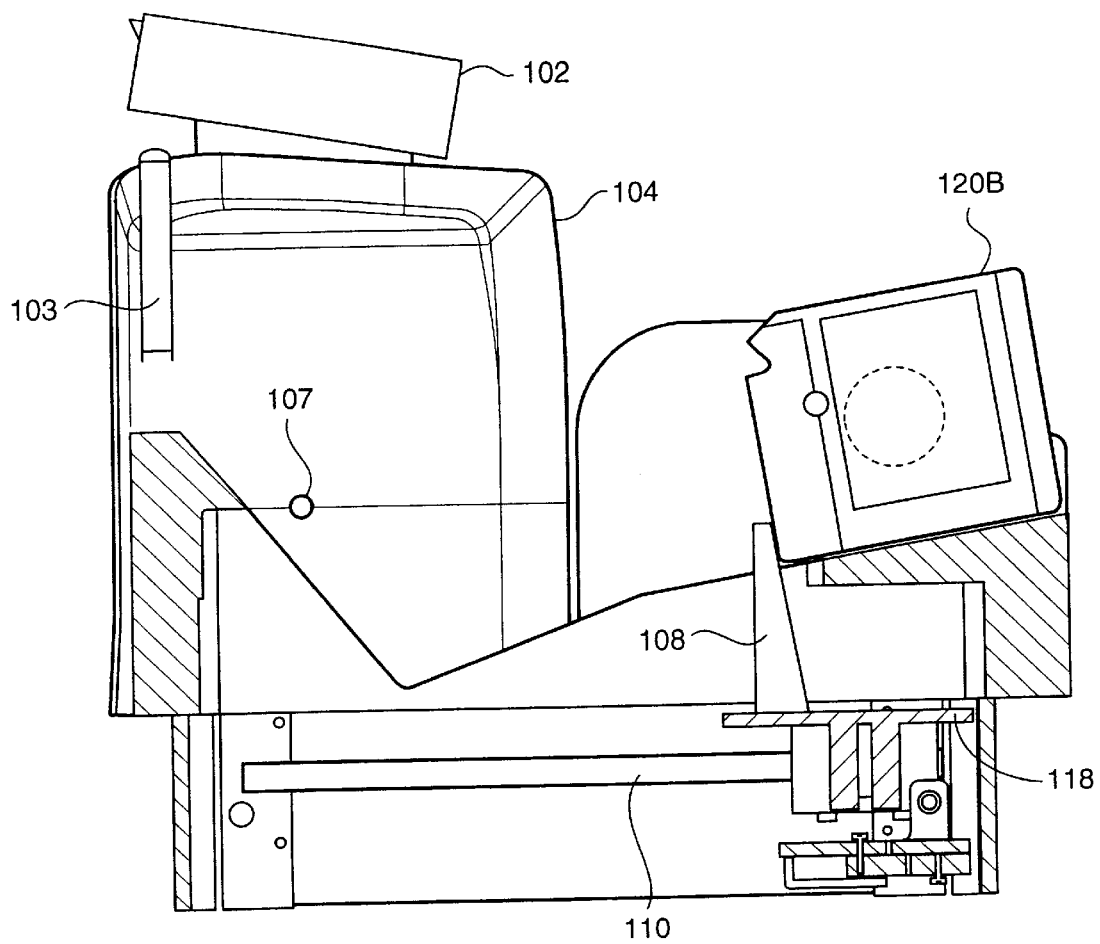

Once the media cartridge 120B is located in the media cartridge path 109, the drive assembly 106 is activated to translate the media carriage 119 from its position at one end of its travel as shown in FIG. 10 along shaft 110 to a second end of its travel as shown in FIG. 11. The media carriage 119 includes a push feature 108 that engages one end of the media cartridge 120B to slide the media cartridge 120B along the media cartridge path 109 and up the incline formed therein to the exit port 105 of the pass thru mechanism 100A. The media cartridge path 109 is architected to present the media cartridge 120B to the robot that is located in the second automated cartridge library system 112 at an angle and orientation that corresponds to that of the media cartridge storage locations 115.

Figure 14:
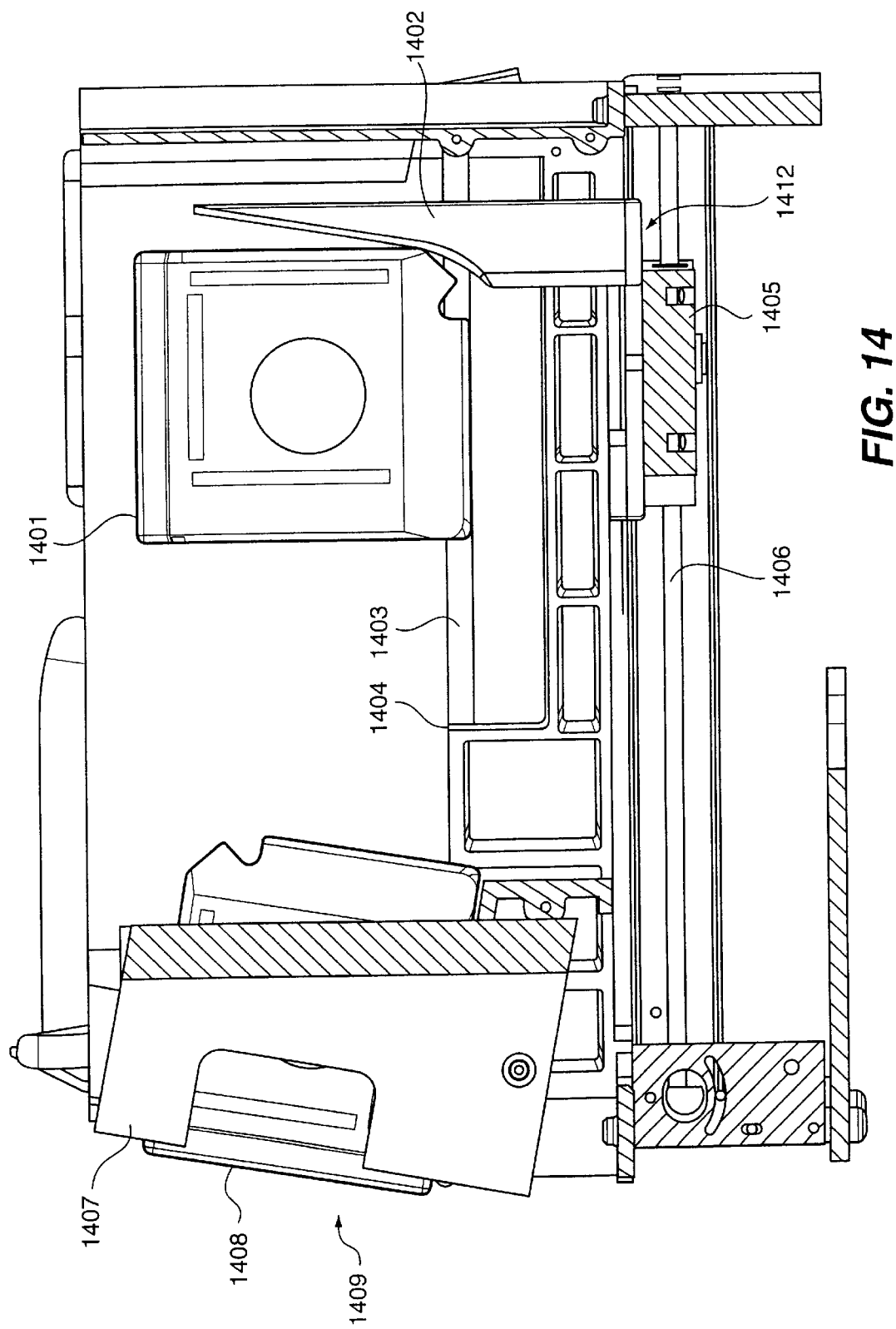
FIGS. 14–17 illustrate cross-section side views of an alternative embodiment of the present pass thru mechanism for transferring media cartridges between automated cartridge library systems illustrating the stepwise progression of a media cartridge through this mechanism.
Figure 15:
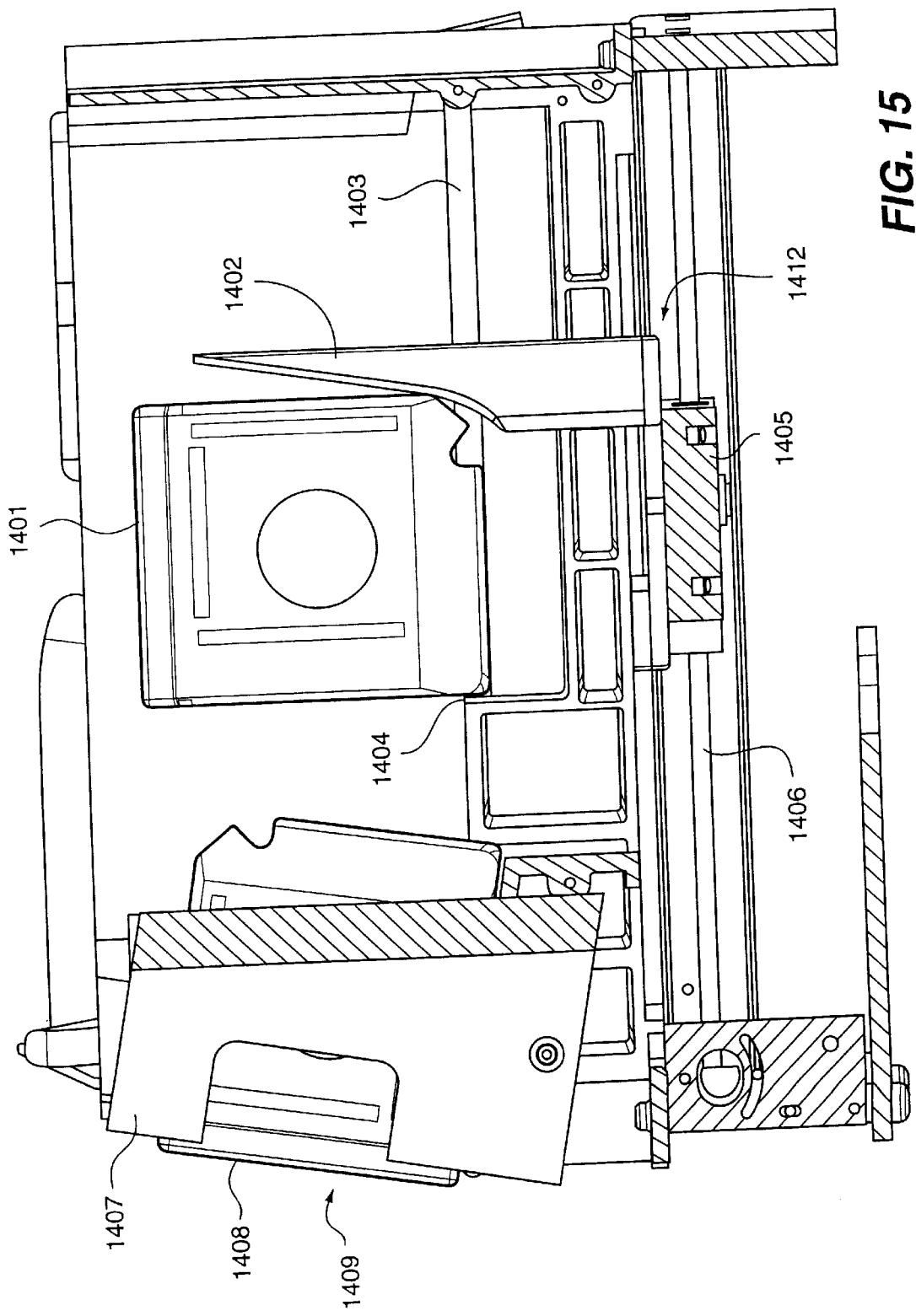
Figure 16:
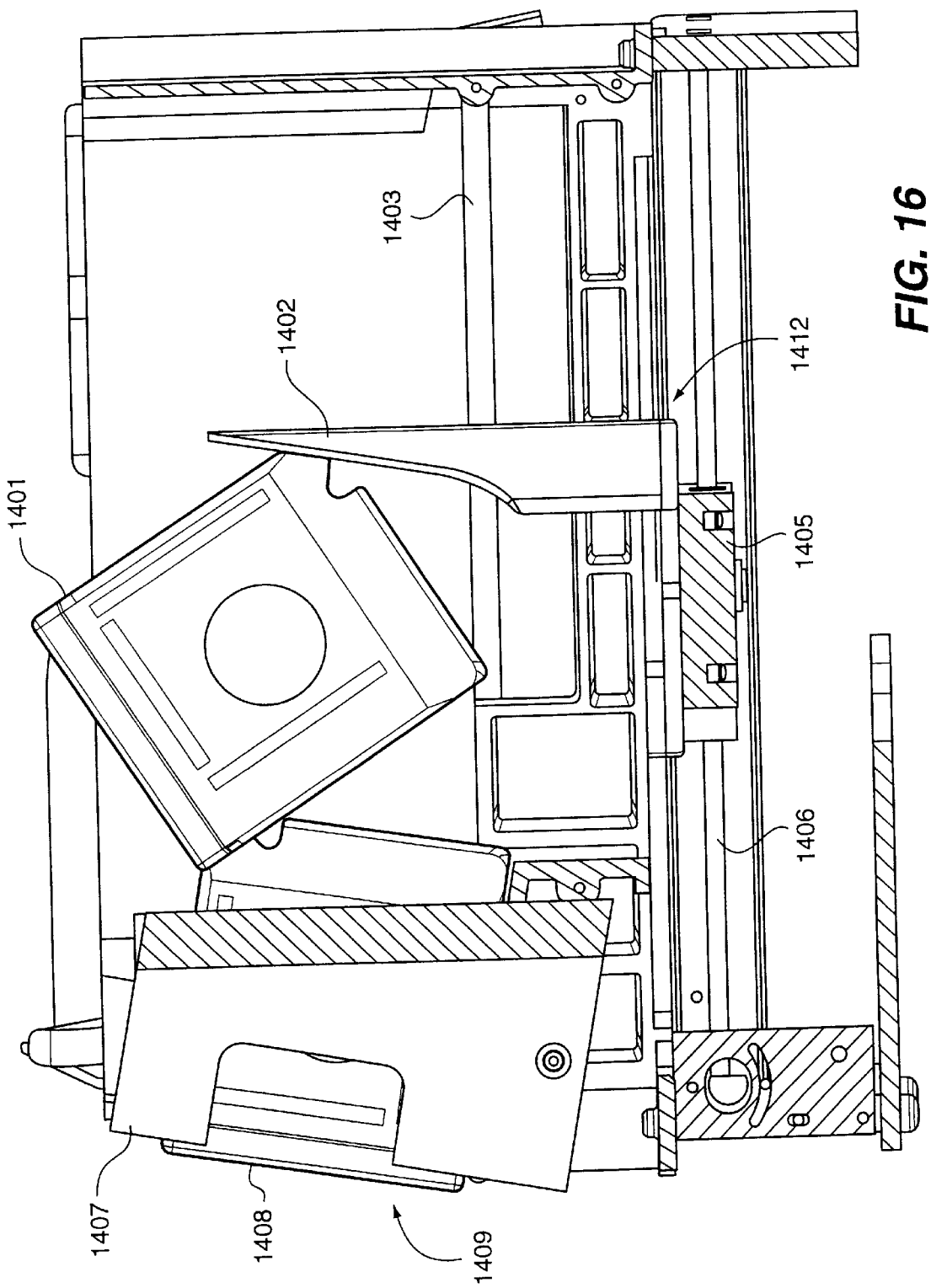
Figure 17:
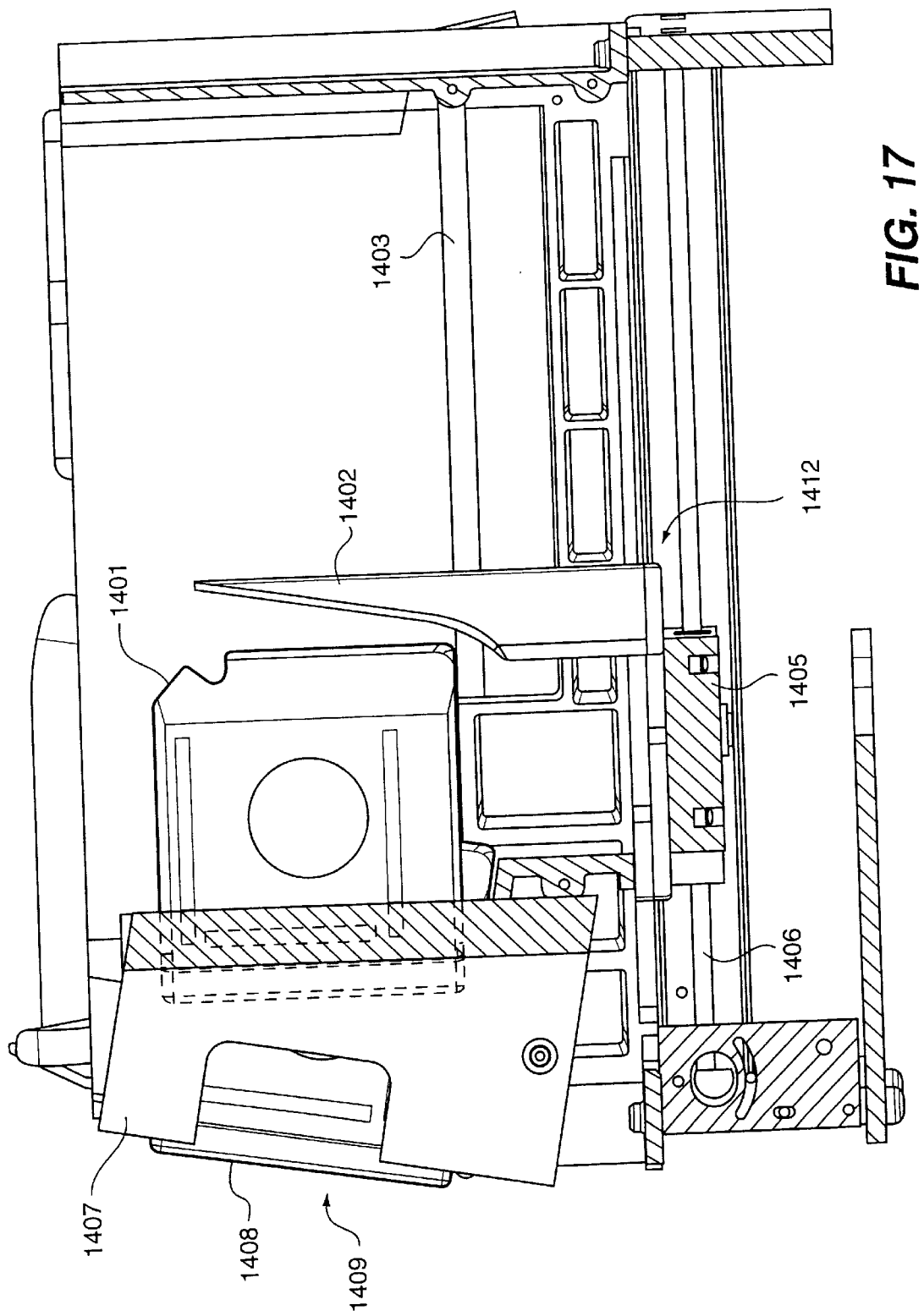
Figure 18:
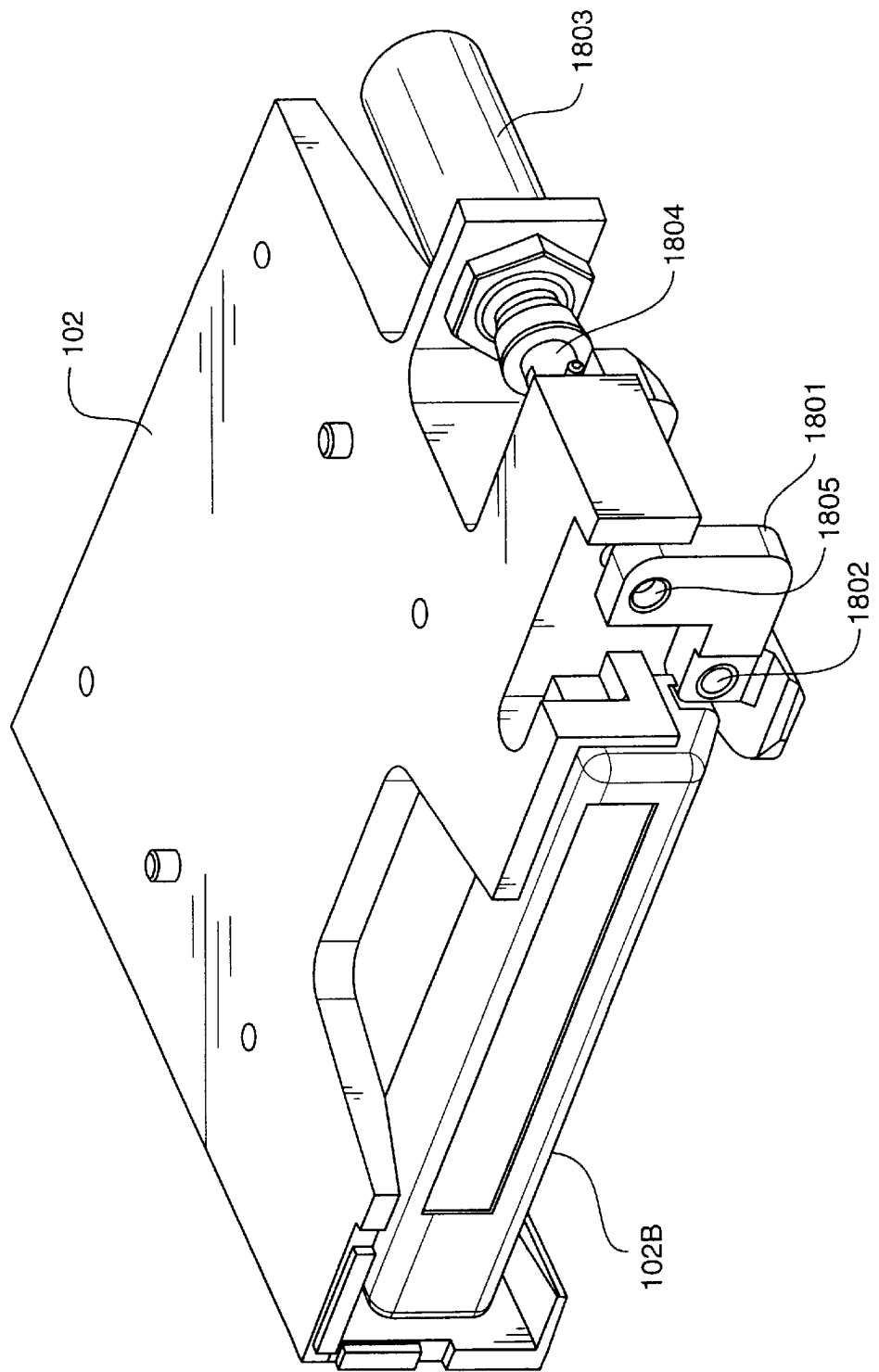
FIGS. 18–22 illustrate various views of an embodiment of the media cartridge receiver of the present pass thru mechanism for transferring media cartridges between automated cartridge library systems illustrating the stepwise progression of a media cartridge through this mechanism.
Figure 19:
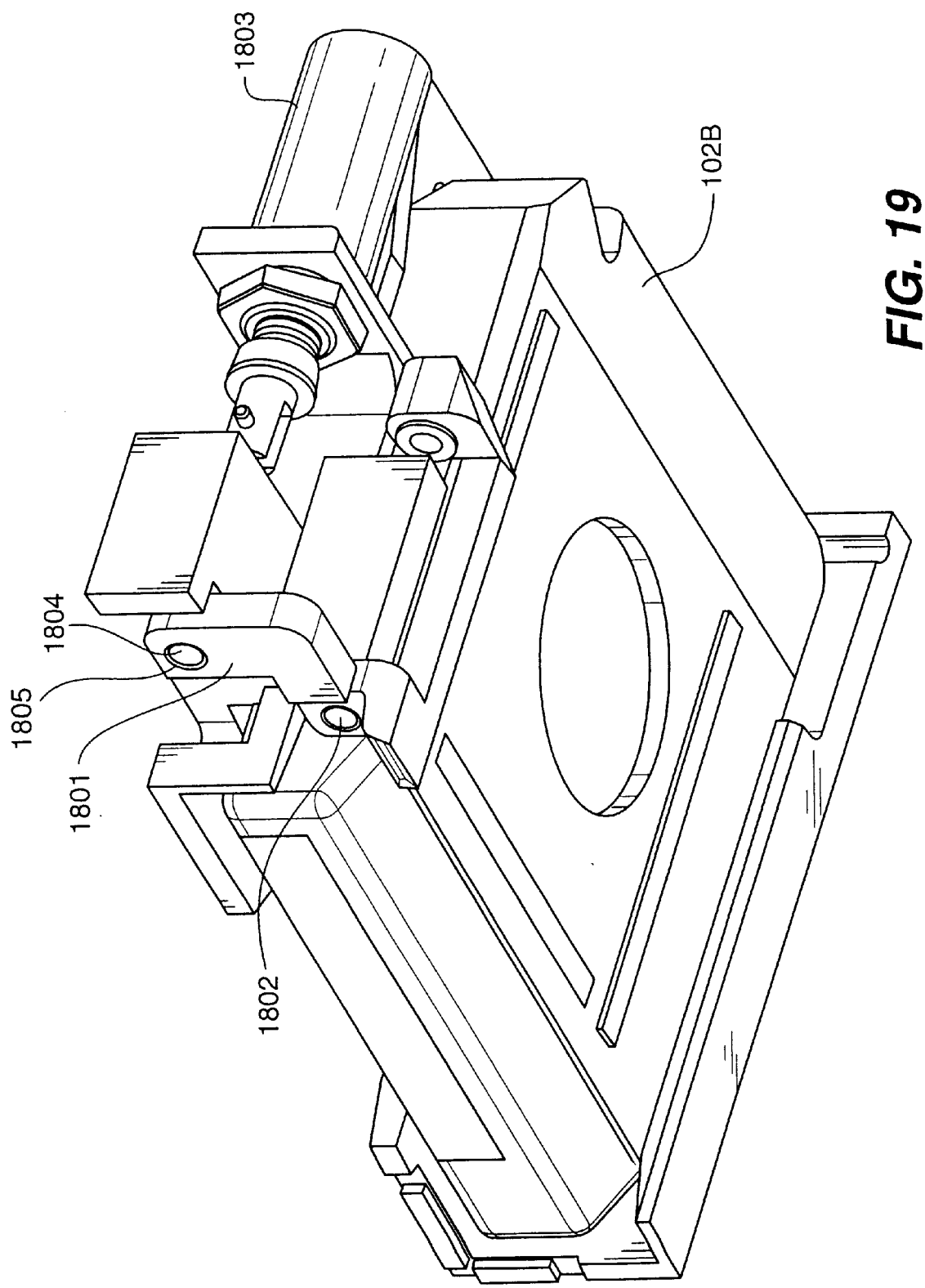

FIGS. 14–17 illustrate cross-section side views of a second embodiment of the present pass thru mechanism. In this embodiment, the second bumper 107 is eliminated by reshaping the ramp 104 and the media cartridge path 109 such that the operation of the media carriage 119 causes the media cartridge 120B to encounter a feature in the media cartridge path 109 to cause the further reorientation of the media cartridge 120B presently caused by the presence of the second bumper 107. Once the media cartridge 1401 is located in the media cartridge path 1403, the drive assembly 1405 is activated to translate the media carriage 1412 from its position at one end of its travel as shown in FIG. 14 along shaft 1406 to a second end of its travel as shown in FIG. 17. The media carriage 1412 includes a push feature 1402 that engages one end of the media cartridge 1401 to slide the media cartridge 1401 along the media cartridge path 1403 to the exit port 1407 of the pass thru mechanism 100A. The media cartridge path 1403 is architected to present the media cartridge 1401 to the robot that is located in the second automated cartridge library system 112 at an angle and orientation that corresponds to that of the media cartridge storage locations 115. Since the second bumper 107 is absent from this embodiment of the pass thru mechanism 100A, the media cartridge 1401, when located in the media cartridge path 1403, is oriented improperly for presentation to the robot that is located in the second automated cartridge library system 112. The media cartridge 1401 must be translated by the operation of the media cartridge path 1403 and the media carriage 1412. This is accomplished by the use of the stop 1404 and the push feature 1402 where the media carriage 1412 translates from its position at one end of its travel as shown in FIG. 14 along shaft 1406 to a second end of its travel as shown in FIG. 17, the bottom front corner of the media cartridge 1401 strikes the stop 1404 as shown in FIG. 15. Since the push feature 1402 of the media carriage 1412 is still engaged with the media cartridge 1401 and moving toward the exit port 1407, the media cartridge 1401 flips over the stop 1404 as shown in FIG. 16 and lands in the remaining segment of the media cartridge path 1403 as shown in FIG. 17 where the push feature 1402 of the media carriage 1412 seats the media cartridge 1401 in the exit port 1407 as shown with media cartridge 1408. The particular shape of the push feature 1402 of the media carriage 1412 is selected to facilitate this flipping action, since the push feature incorporates a curved shape to lift the media cartridge 1401 as well as push it over the stop 1404. The walls of the exit port 1407 include a cutout section 1409 to enable the gripper of the robot to grasp the media cartridge 1408 that is seated in the exit port 1407.

Alternative Features of the Pass Thru Mechanism

There are a number of alternative features that can be included in the pass thru mechanism 100. The use of the drive assembly 106 reduces the height of the pass thru mechanism 100 but adds a motorized element to the pass thru mechanism 100. The use of movable parts can be further reduced if the media cartridge path 109 comprises a further downwardly sloping segment of ramp 104, to thereby cause the media cartridge 120B to slide the entire distance to the exit port 105. If the robots in the respective automated cartridge library systems 111, 112 were located closer together, the need for a media cartridge path 109 could be eliminated, since the media cartridge 120B would be properly located in the media cartridge path 109 when it finishes its fall down ramp 104.

The second bumper 107 could also be eliminated by reshaping the ramp 104 and the media cartridge path 109 such that the operation of the media carriage 119 causes the media cartridge 120B to encounter a feature in the media cartridge path 109 to cause the further reorientation of the media cartridge 120B presently caused by the presence of the second bumper 107.

The vertical presentation of the media cartridge 120B at the exit port 105 is selected to conform to the orientation of the cartridge storage locations in the second automated cartridge library system 112. This presentation could alternatively be in the horizontal mode by the use of a further media cartridge repositioning mechanism as shown in FIGS. 12 and 13. In particular, the media cartridge path 109 can have included therein an angled ledge 121 that causes the media cartridge 120B to tilt and fall into the exit tray 122 once the media cartridge 120B clears the end of wall 117. Thus, the pass thru mechanism 100 can accommodate two robots that require different media cartridge orientations, for example in the case where the robot is not equipped with a roll mechanism.

Another variation in the pass thru mechanism 100 is the orientation of the media cartridge receiver 102. A horizontal orientation of the media cartridge receiver 102 is shown in the figures since this configuration reduces the height of the pass thru mechanism 100 and also simplifies the media cartridge orientation process, since the robot partially repositions the media cartridge by translating the retrieved media cartridge from a vertical orientation to a horizontal orientation. However, a vertical orientation or some other angled orientation of the media cartridge receiver is possible.

While these variations of the pass thru mechanism are noted, other variations in both the architecture and implementation thereof that fall within the scope of the appended claims are expected to be obvious to one skilled in the art.

SUMMARY

The pass thru mechanism makes use of gravity and a media cartridge tumble and repositioning mechanism to perform the media cartridge translation. Only a single powered media cartridge carriage is then required to transport the media cartridge to the robot that is located in the juxtaposed automated cartridge library system. This pass thru mechanism is simple, efficient and frugal with the space required to implement the media cartridge pass thru function.

What is claimed is:

1. In two juxtaposed automated cartridge library systems that robotically store and retrieve a plurality of media cartridges stored therein, a pass thru apparatus connected to a first and a second of said two juxtaposed automated cartridge library systems, for automatically transporting media cartridges from said first to said second of said two juxtaposed automated cartridge library systems, comprising:

cartridge receiving means, located within said first of said two juxtaposed automated cartridge library systems, for receiving a selected media cartridge deposited therein by a robot mechanism operational in said first of said two juxtaposed automated cartridge library systems, comprising:

means for providing a media cartridge receiving aperture that is bounded on at least two opposing sides by walls, means, operable in response to insertion of said selected media cartridge in said media cartridge receiving aperture, for preventing said selected media cartridge from being withdrawn back out of said media cartridge receiving aperture;

means, responsive to a receipt of said selected media cartridge, for automatically transporting said selected media cartridge from said first of said two juxtaposed automated cartridge library systems to said second of said two juxtaposed automated cartridge library systems; and means for depositing said selected media cartridge, received from said cartridge receiving means, into said means for automatically transporting in an orientation to enable a robot mechanism operational in said second of said two juxtaposed automated cartridge library systems to access said selected media cartridge.

2. In two juxtaposed automated cartridge library systems that robotically store and retrieve a plurality of media cartridges stored therein, a pass thru apparatus connected to a first and a second of said two juxtaposed automated cartridge library systems, for automatically transporting media cartridges from said first to said second of said two juxtaposed automated cartridge library systems, comprising:

cartridge receiving means, located within said first of said two juxtaposed automated cartridge library systems, for receiving a selected media cartridge deposited therein by a robot mechanism operational in said first of said two juxtaposed automated cartridge library systems;

means, responsive to a receipt of said selected media cartridge, for automatically transporting said selected media cartridge from said first of said two juxtaposed automated cartridge library systems to said second of said two juxtaposed automated cartridge library systems, comprising:

media cartridge guide means, located below said cartridge receiving means, for guiding said selected media cartridge to said robot mechanism operational in said second of said two juxtaposed automated cartridge library systems;

cartridge carriage means for engaging said selected media cartridge when placed in said media cartridge guide means to transport said selected media cartridge through said media cartridge guide means to said robot mechanism operational in said second of said two juxtaposed automated cartridge library systems; and means for depositing said selected media cartridge, received from said cartridge receiving means, into said means for automatically transporting in an orientation to enable a robot mechanism operational in said second of said two juxtaposed automated cartridge library systems to access said selected media cartridge.

3. The pass thru apparatus of claim 2 wherein said means for transporting further comprises:

drive means for causing linear movement of said cartridge carriage means through said media cartridge guide means to said robot mechanism operational in said second of said two juxtaposed automated cartridge library systems.

4. The pass thru apparatus of claim 2 wherein said means for transporting further comprises:

means, located at an end of said media cartridge guide means distal from said media cartridge receiving means, for transforming a substantially vertical orientation of said selected media cartridge to a substantially horizontal media cartridge orientation.

5. In two juxtaposed automated cartridge library systems that robotically store and retrieve a plurality of media cartridges stored therein, a pass thru apparatus connected to a first and a second of said two juxtaposed automated cartridge library systems, for automatically transporting media cartridges from said first to said second of said two juxtaposed automated cartridge library systems, comprising:

cartridge receiving means, located within said first of said two juxtaposed automated cartridge library systems, for receiving a selected media cartridge deposited therein by a robot mechanism operational in said first of said two juxtaposed automated cartridge library systems;

means, responsive to a receipt of said selected media cartridge, for automatically transporting said selected media cartridge from said first of said two juxtaposed automated cartridge library systems to said second of said two juxtaposed automated cartridge library systems; and means for depositing said selected media cartridge, received from said cartridge receiving means, into said means for automatically transporting in an orientation to enable a robot mechanism operational in said second of said two juxtaposed automated cartridge library systems to access said selected media cartridge, comprising:

first bumper means, located to impact said selected media cartridge in a predetermined impact point when said selected media cartridge is received from said cartridge receiving means, for pivoting said selected media cartridge a predetermined amount around said first bumper means.

6. The pass thru apparatus of claim 5 wherein said means for depositing further comprises:

ramp means, responsive to receipt of said selected media cartridge from said first bumper means, for transforming a substantially horizontal orientation of said selected media cartridge to a substantially vertical media cartridge orientation.

7. The pass thru apparatus of claim 6 wherein said means for depositing further comprises:

second bumper means responsive to receipt of said selected media cartridge from said ramp means, for pivoting said selected media cartridge a predetermined amount around said second bumper means to an orientation to enable a robot mechanism operational in said second of said two juxtaposed automated cartridge library systems to access said selected media cartridge.

8. In two juxtaposed automated cartridge library systems that robotically store and retrieve a plurality of media cartridges stored therein, having a pass thru apparatus connected to a first and a second of said two juxtaposed automated cartridge library systems, a method for automatically transporting media cartridges from said first to said second of said two juxtaposed automated cartridge library systems, comprising the steps of:

depositing a selected media cartridge in a cartridge receiver that is located within said first of said two juxtaposed automated cartridge library systems;

reorienting said selected media cartridge, received from said cartridge receiver, into an orientation to enable a robot mechanism operational in said second of said two juxtaposed automated cartridge library systems to access said selected media cartridge;

automatically transporting said reoriented selected media cartridge to said second of said two juxtaposed automated cartridge library systems; and latching, in response to insertion of said selected media cartridge in said media cartridge receiving aperture, said media cartridge to prevent said selected media cartridge from being withdrawn back out of said media cartridge receiving aperture.

9. In two juxtaposed automated cartridge library systems that robotically store and retrieve a plurality of media cartridges stored therein, having a pass thru apparatus connected to a first and a second of said two juxtaposed automated cartridge library systems, a method for automatically transporting media cartridges from said first to said second of said two juxtaposed automated cartridge library systems, comprising the steps of:

depositing a selected media cartridge in a cartridge receiver that is located within said first of said two juxtaposed automated cartridge library systems;

reorienting said selected media cartridge, received from said cartridge receiver, into an orientation to enable a robot mechanism operational in said second of said two juxtaposed automated cartridge library systems to access said selected media cartridge, comprising:

guiding said selected media cartridge through a media cartridge guide path to said robot mechanism operational in said second of said two juxtaposed automated cartridge library systems, engaging said selected media cartridge when placed in said media cartridge guide to transport said selected media cartridge through said media cartridge guide to said robot mechanism operational in said second of said two juxtaposed automated cartridge library systems; and automatically transporting said reoriented selected media cartridge to said second of said two juxtaposed automated cartridge library systems.

10. The method of claim 9 wherein said step of reorienting further comprises:

transforming, at an end of said media cartridge guide means distal from said media cartridge receiver, a substantially vertical orientation of said selected media cartridge to a subutantially horizontal media cartridge orientatation.

11. In two juxtaposed automated catridge library systems that robotically store an retrieve a plurality of media catridges stored therein, having a pass thru apparatus connected to a first and a second of said two juxtaposed automated cartidge library systems, a method for automatically transporting media cartridges from said first to said second of said two juxtaposed automated cartridge library systems, comprising the steps of:

depositing a selected media cartridge in a cartridge receiver that is located within said first of said two juxtaposed automated cartridge library systems;

reorienting said selected media cartridge, received from said cartridge receiver, into an orientation to enable a robot mechanism operational in said second of said two juxtaposed automated cartridge library systems to access said selected media cartridge, comprising:

pivoting said selected media cartridge a predetermined amount around a first bumper; and automatically transporting said reoriented selected media cartridge to said second of said two juxtaposed automated cartridge library systems.

12. The method of claim 11 wherein said step of reorienting further comprises:

transforming a substantially horizontal orientation of said selected media cartridge to a substantially vertical media cartridge orientation after said selected media cartridge impacts said first bumper.

13. The method of claim 12 wherein said step of reorienting further comprises:

pivoting said selected media cartridge, once in said substantially vertical orientation, a predetermined amount around a second bumper to an orientation to enable a robot mechanism operational in said second of said two juxtaposed automated cartridge library systems to access said selected media cartridge.

* * * * *